US012578521B2

(12) United States Patent
Komura et al.

(10) Patent No.: US 12,578,521 B2
(45) Date of Patent: Mar. 17, 2026

(54) LENS PORTION AND DISPLAY DEVICE

(71) Applicant: Magnolia White Corporation, Tokyo (JP)

(72) Inventors: Shinichi Komura, Tokyo (JP); Koichi Okuda, Tokyo (JP); Ken Onoda, Tokyo (JP); Hiroaki Kijima, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 666 days.

(21) Appl. No.: 18/073,566

(22) Filed: Dec. 2, 2022

(65) Prior Publication Data

US 2023/0185007 A1 Jun. 15, 2023

(30) Foreign Application Priority Data

Dec. 15, 2021 (JP) ................................. 2021-203401

(51) Int. Cl.
*G02B 5/30* (2006.01)
*G02B 3/02* (2006.01)

(52) U.S. Cl.
CPC ............. *G02B 5/3016* (2013.01); *G02B 3/02* (2013.01)

(58) Field of Classification Search
CPC .......... G02B 5/3016; G02B 3/02; G02B 3/10; G02B 5/3083
See application file for complete search history.

(56) References Cited

U.S. PATENT DOCUMENTS 6,421,183 B1 7/2002 Ophey
11,199,721 B1 * 12/2021 McEldowney ...... G03H 1/0248

2001/0028332 A1 10/2001 Roest
2018/0180889 A1 6/2018 Lee et al.
2018/0210222 A1 7/2018 Seo et al.
2018/0356639 A1* 12/2018 Schaefer .............. G02B 27/017
2019/0079234 A1 3/2019 Takagi et al.
2019/0265493 A1 8/2019 Takagi et al.
2019/0265494 A1 8/2019 Takagi et al.

FOREIGN PATENT DOCUMENTS

JP 2003-504663 A 2/2003
JP 2003-529795 A 10/2003
JP 2018-106160 A 7/2018
JP 2019-053152 A 4/2019
JP 2019-148626 A 9/2019
JP 2019-148627 A 9/2019

OTHER PUBLICATIONS

Japanese Office Action issued Sep. 9, 2025, in corresponding JP Application No. 2021-203401, 8pp.

* cited by examiner

*Primary Examiner* — Thomas K Pham
*Assistant Examiner* — Jennifer A Jones
(74) *Attorney, Agent, or Firm* — XSENSUS LLP

(57) ABSTRACT

According to one embodiment, a lens portion includes a first lens element converging while converting first circularly polarized light into second circularly polarized light and a second lens element converging while converting the second circularly polarized light into the first circularly polarized light. Each of the first lens element and the second lens element includes first liquid crystal molecules, and the alignment direction of the first liquid crystal molecules of the first lens element is line symmetry with the alignment direction of the first liquid crystal molecules of the second lens element.

9 Claims, 16 Drawing Sheets

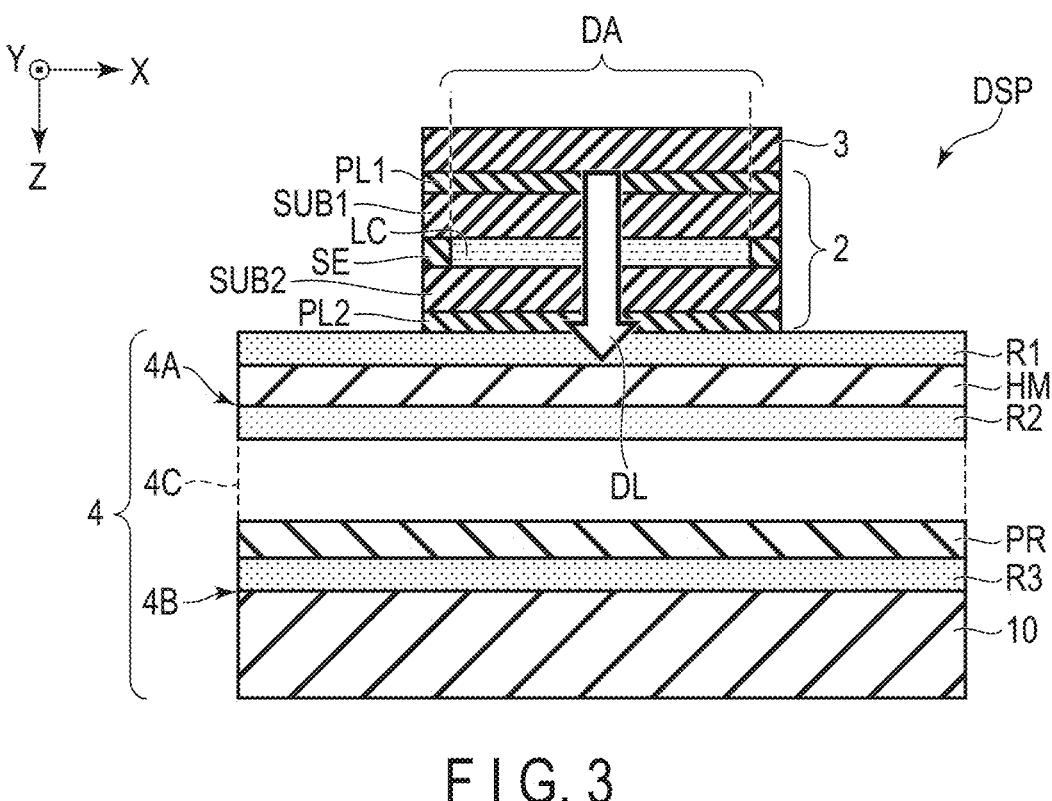
F I G. 3
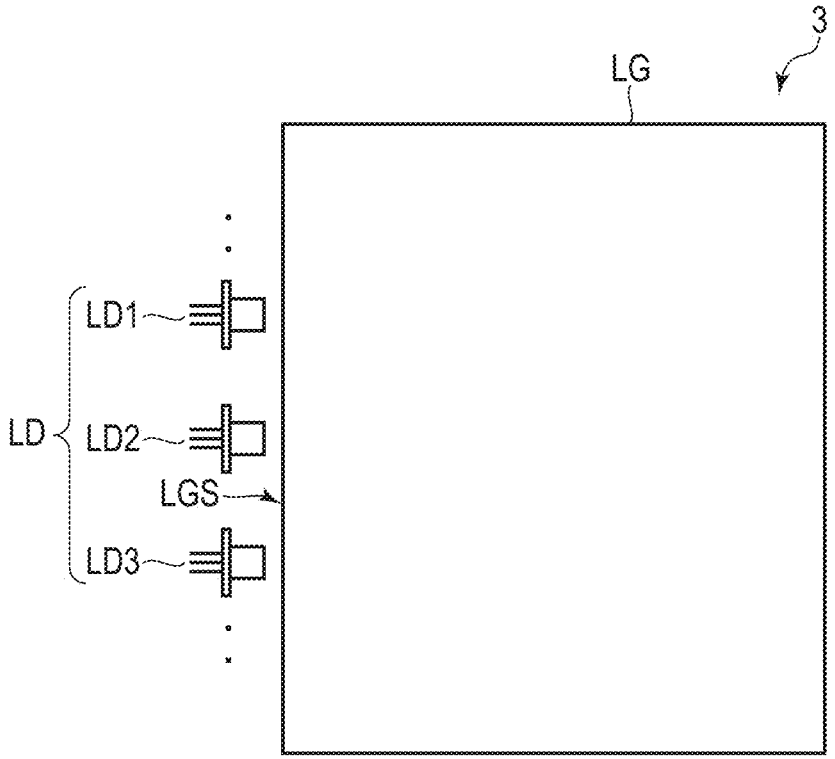
F I G. 4

$$f_s = \frac{f_1 f_2}{f_1 + f_2 - d} = \frac{f^2}{2f - d} \cong \frac{1}{2} f \quad ---- (1)$$

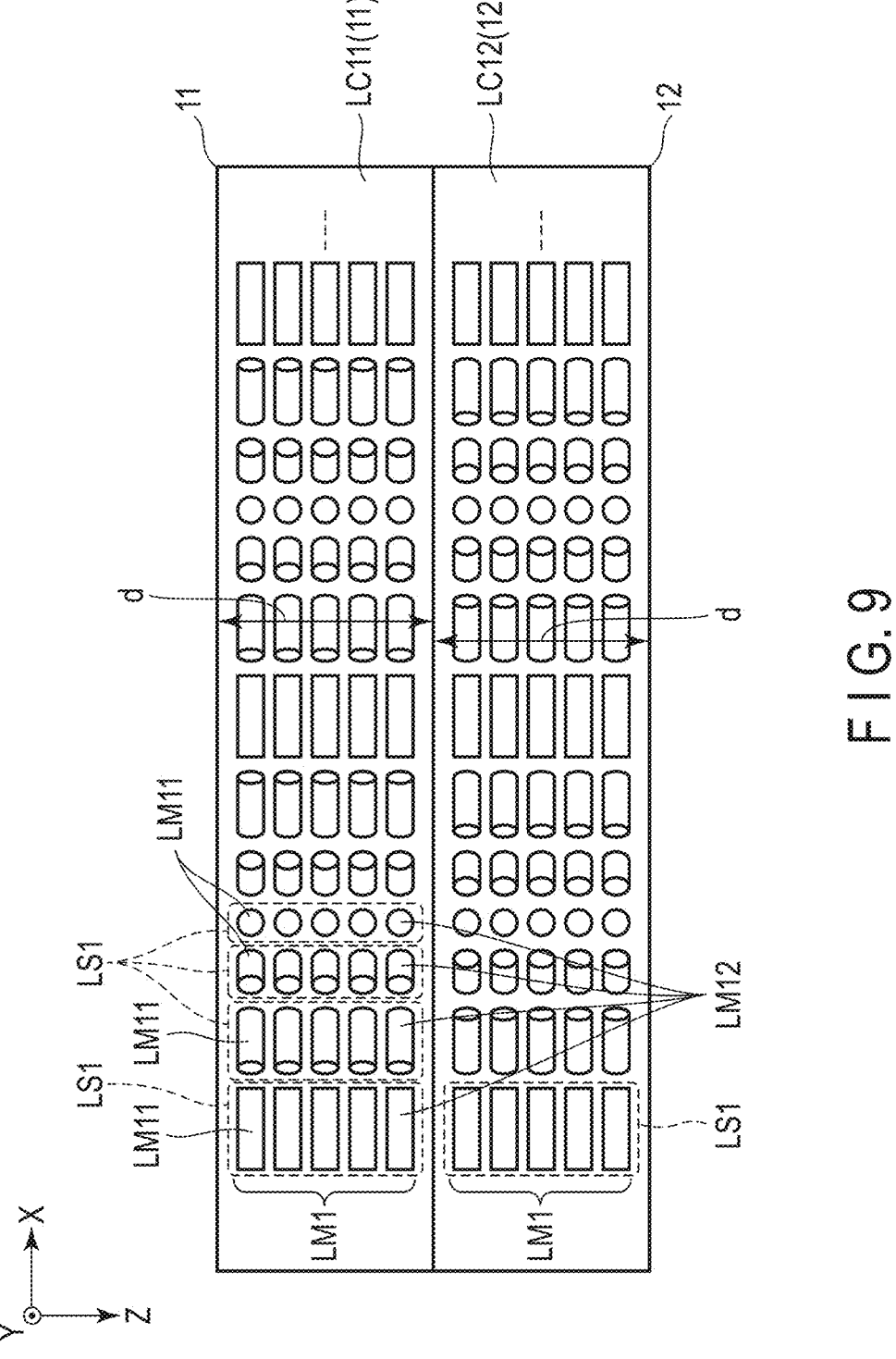
F I G. 9

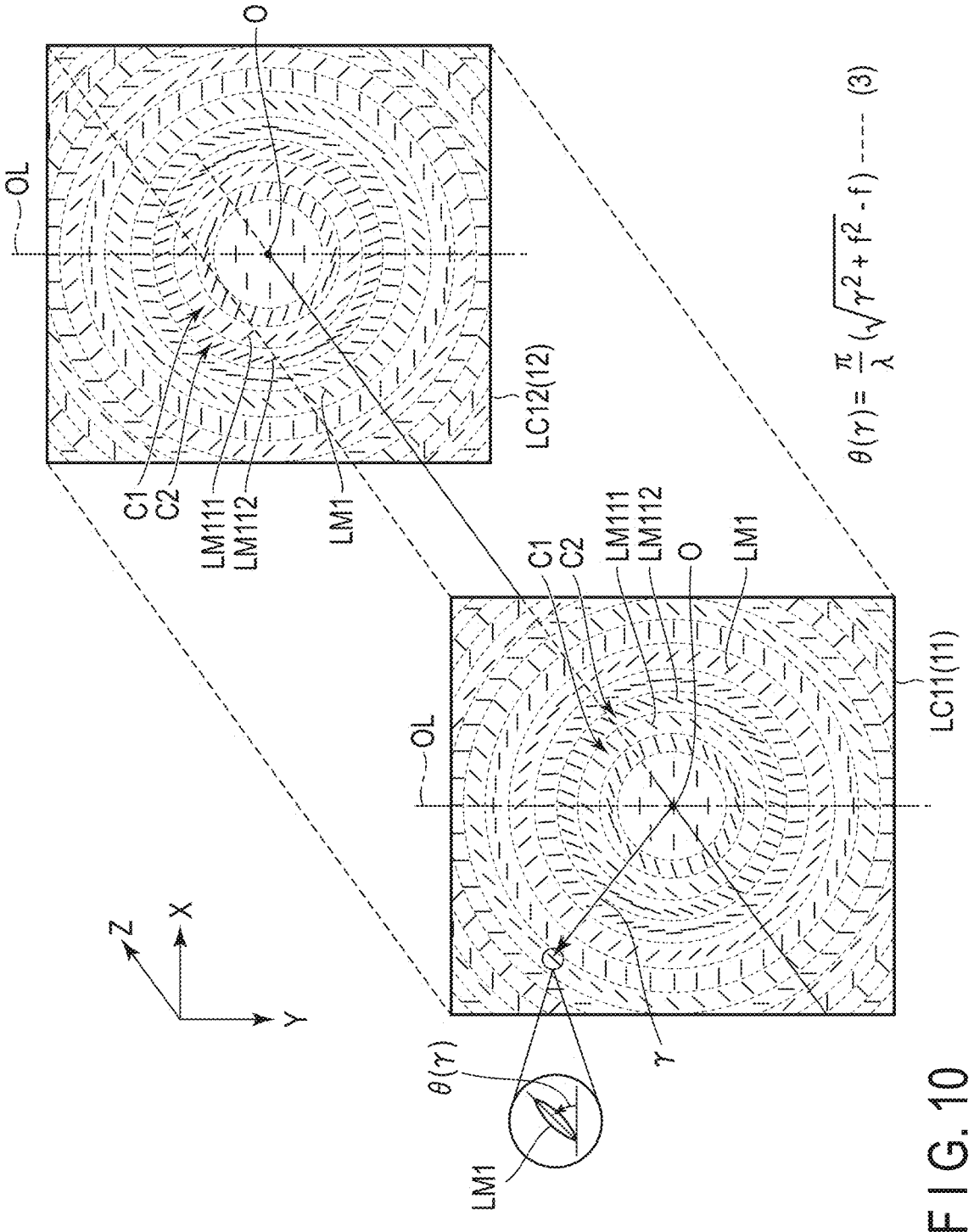
$$\theta(\gamma) = \frac{\pi}{\lambda} \left( \sqrt{\gamma^2 + f^2} - f \right) \cdots (3)$$
F I G. 10

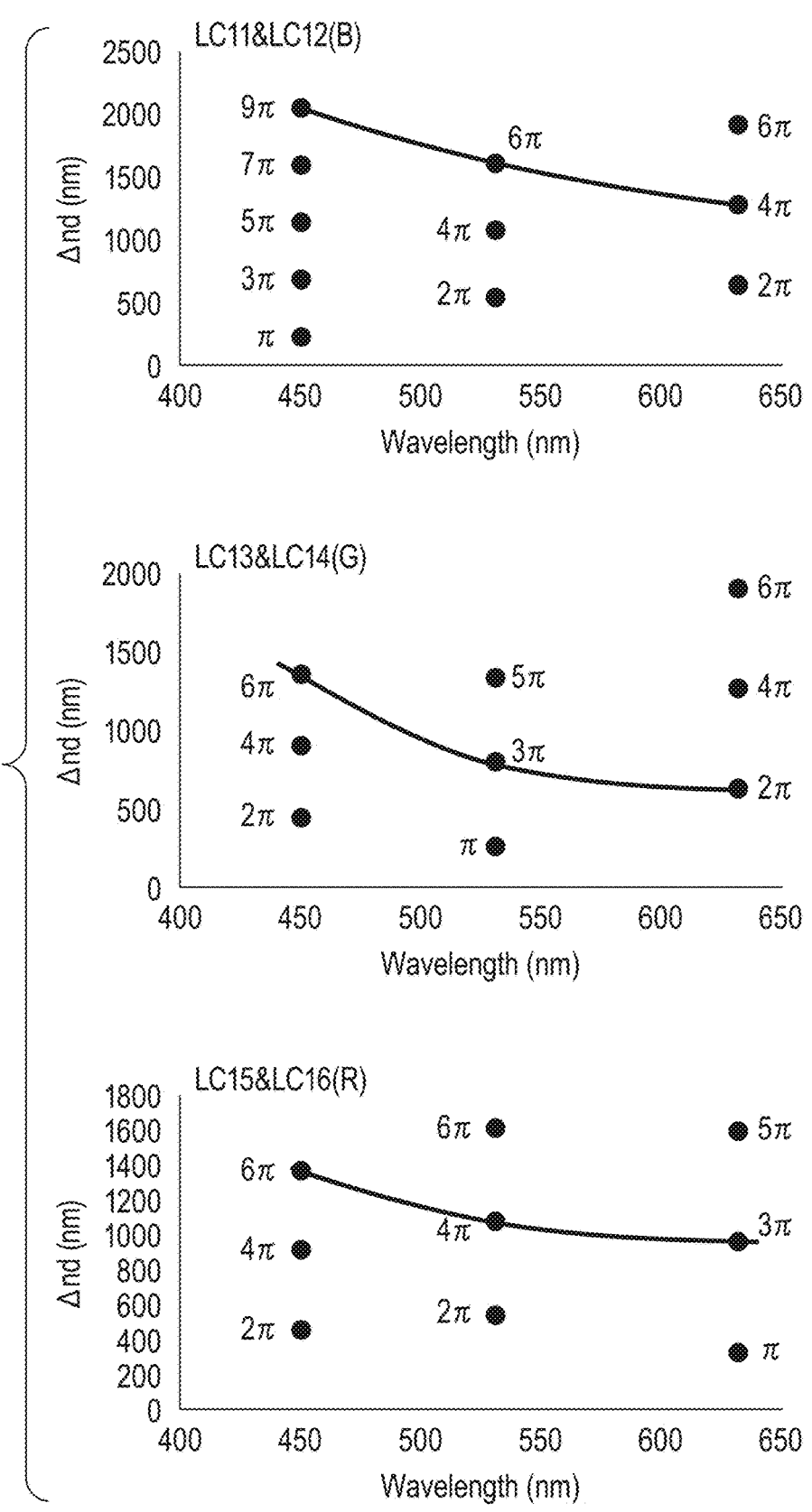
F I G. 11

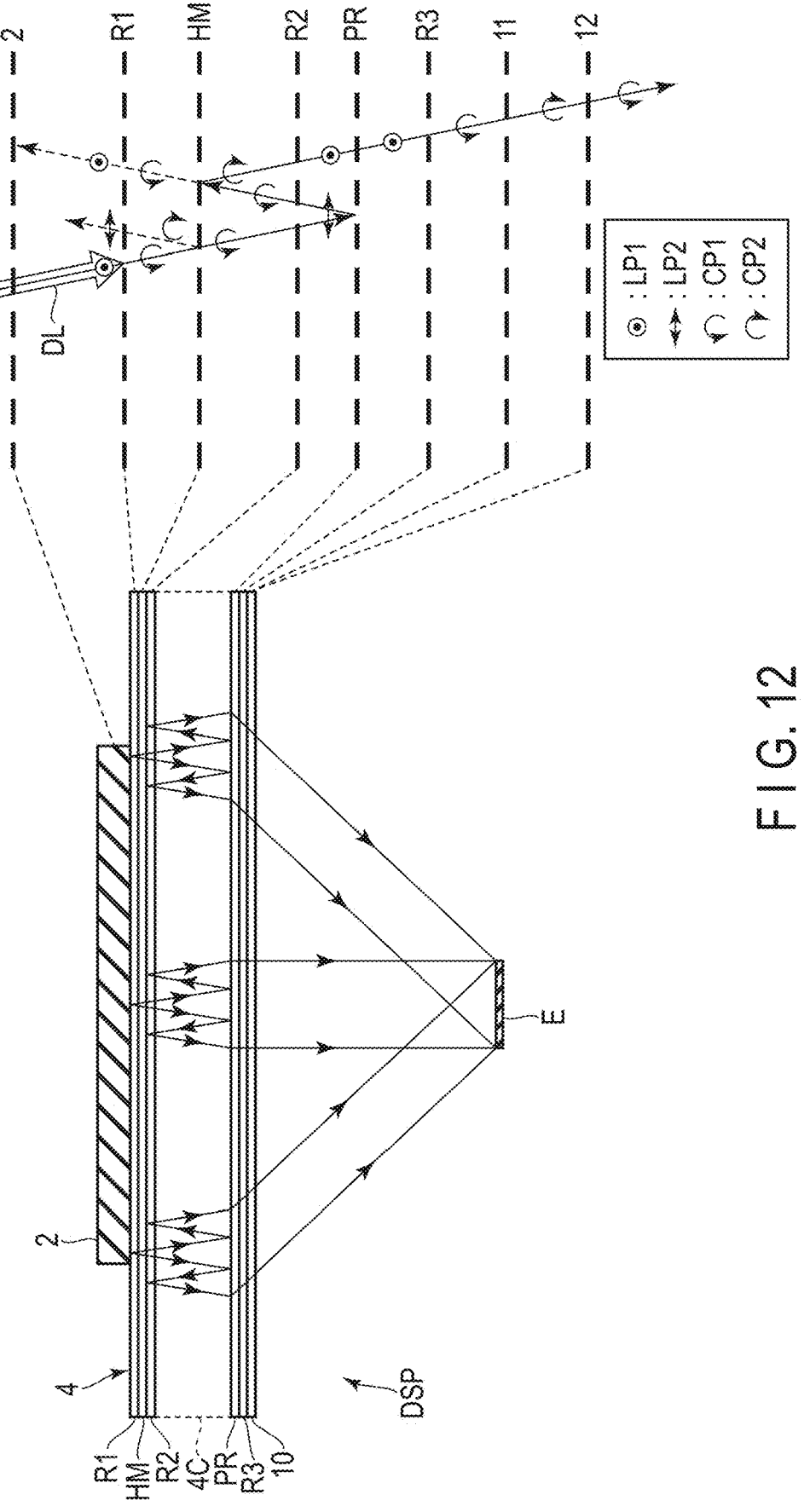
F I G. 12

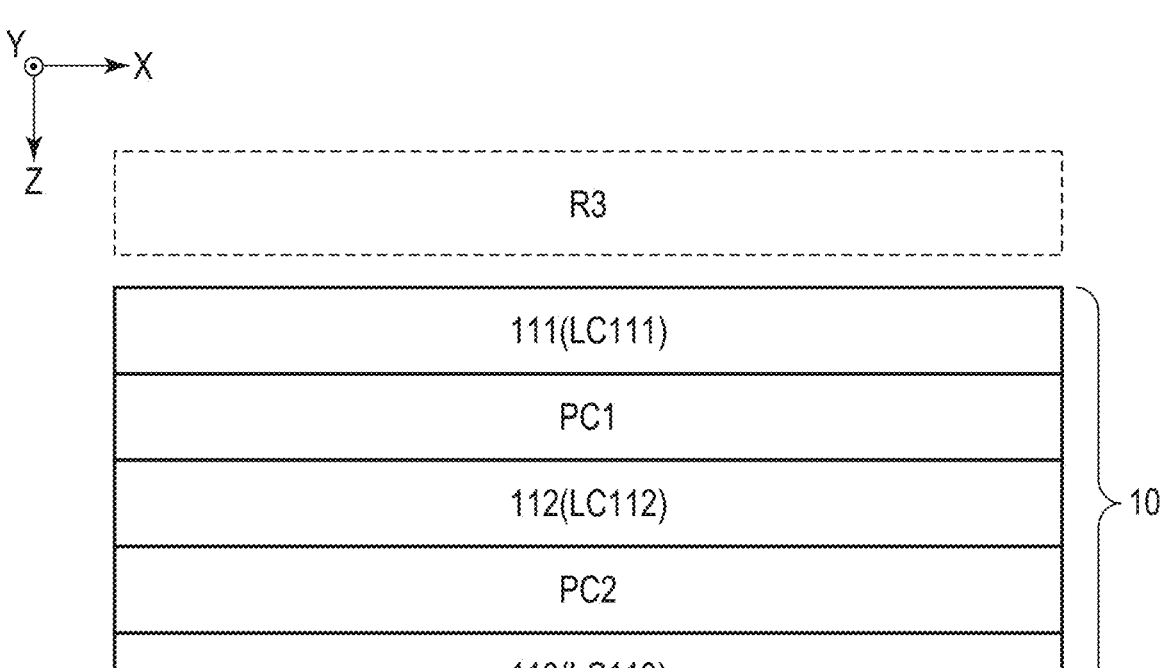
F I G. 13A
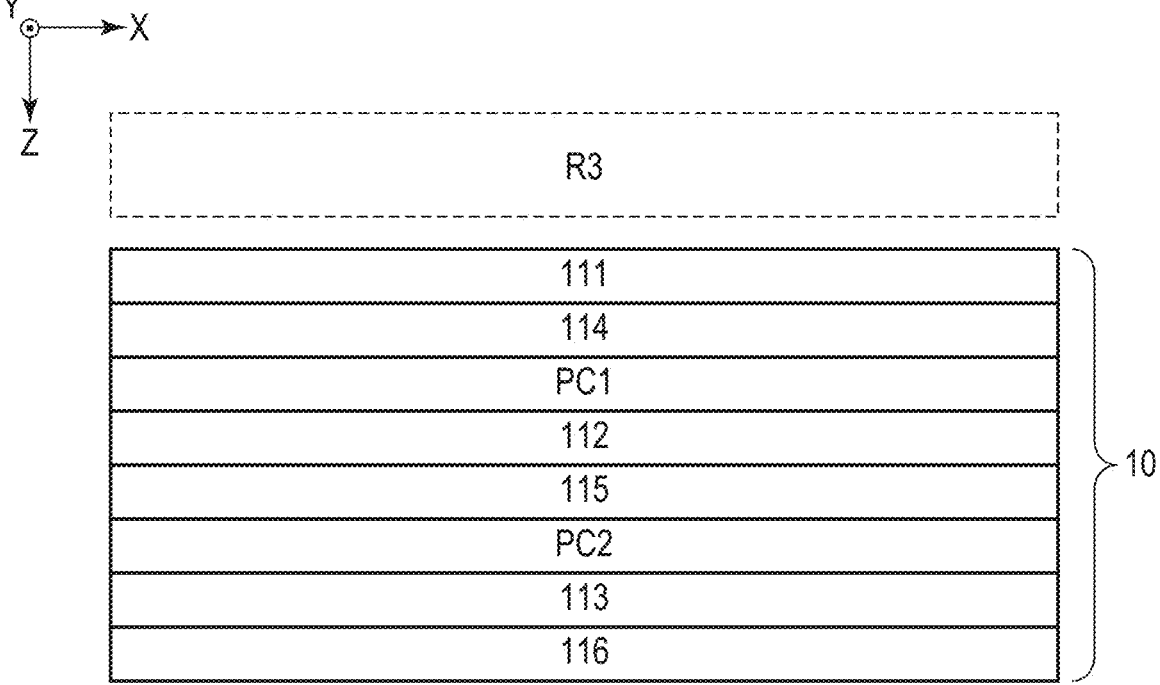
F I G. 13B

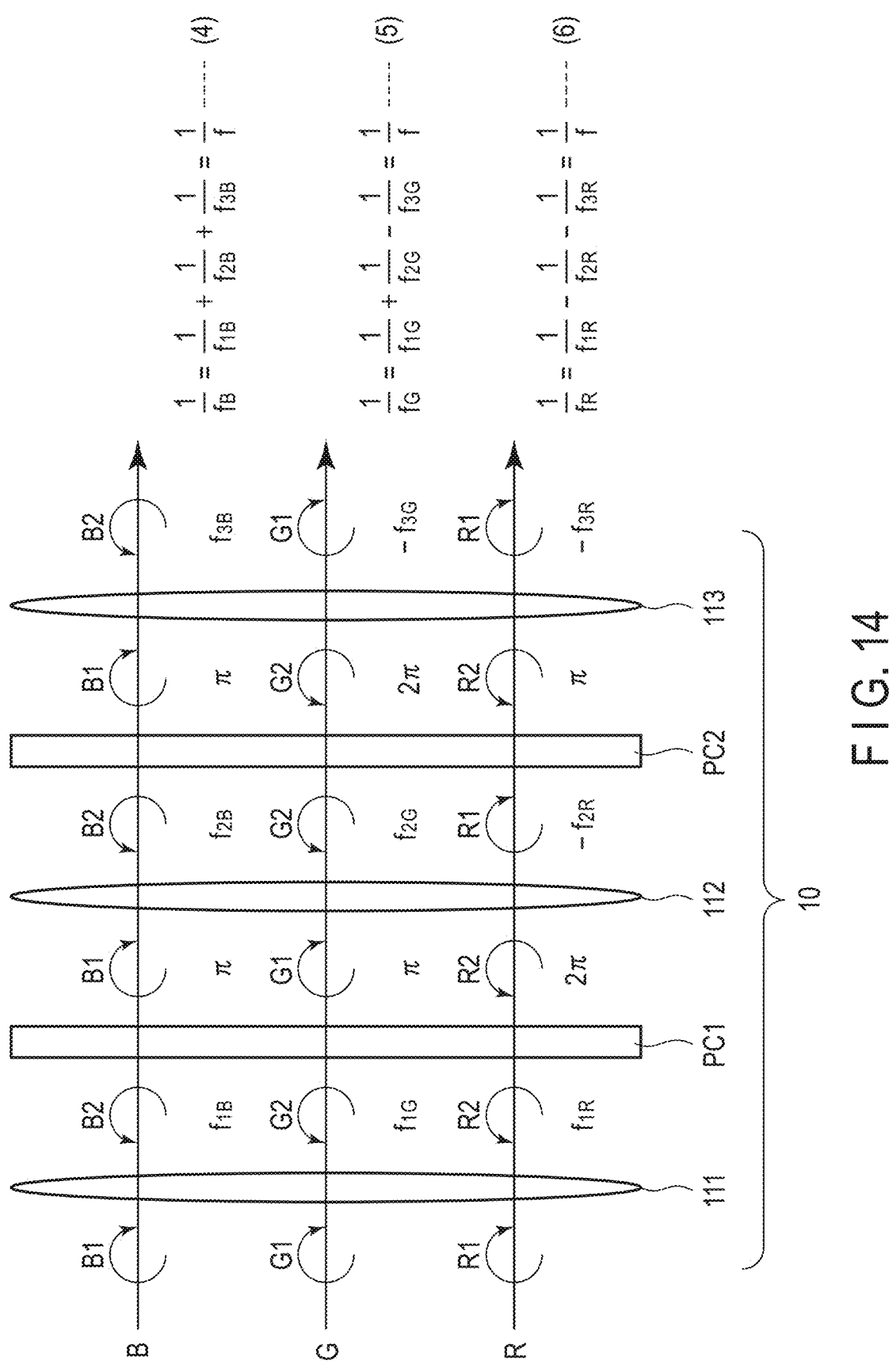
$$\frac{1}{f_B} = \frac{1}{f_{1B}} + \frac{1}{f_{2B}} + \frac{1}{f_{3B}} = \frac{1}{f} \quad \text{----- (4)}$$
$$\frac{1}{f_G} = \frac{1}{f_{1G}} + \frac{1}{f_{2G}} - \frac{1}{f_{3G}} = \frac{1}{f} \quad \text{----- (5)}$$
$$\frac{1}{f_R} = \frac{1}{f_{1R}} - \frac{1}{f_{2R}} - \frac{1}{f_{3R}} = \frac{1}{f} \quad \text{----- (6)}$$
F I G. 14

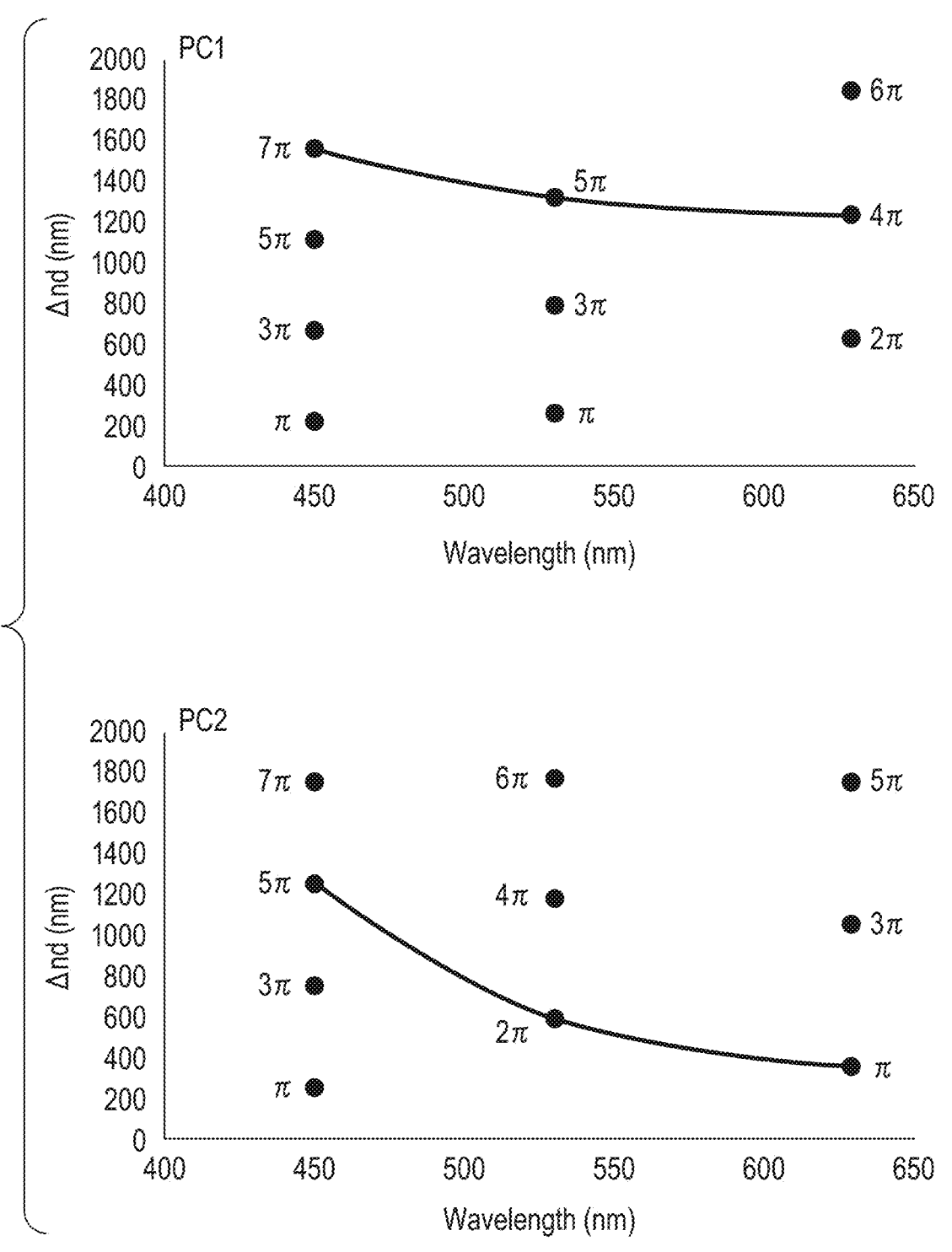
F I G. 15

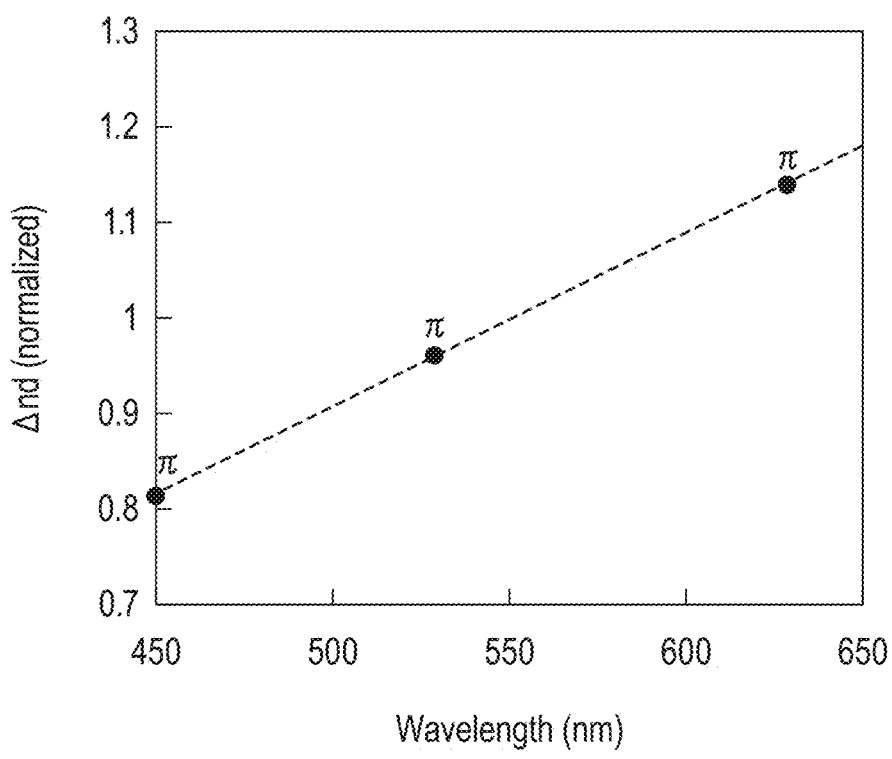
F I G. 16
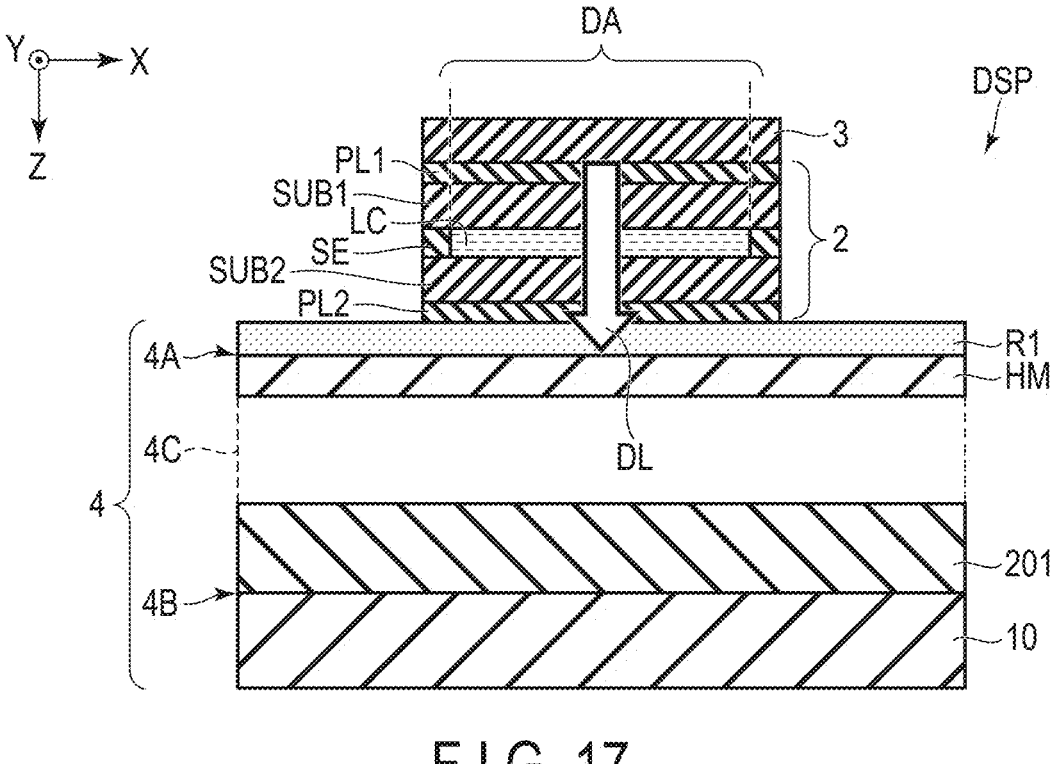
F I G. 17

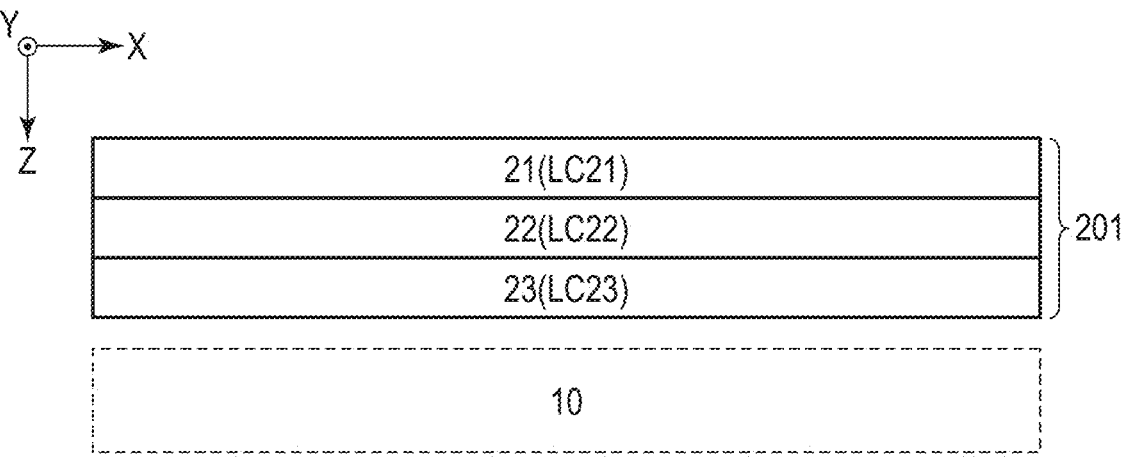
F I G. 18
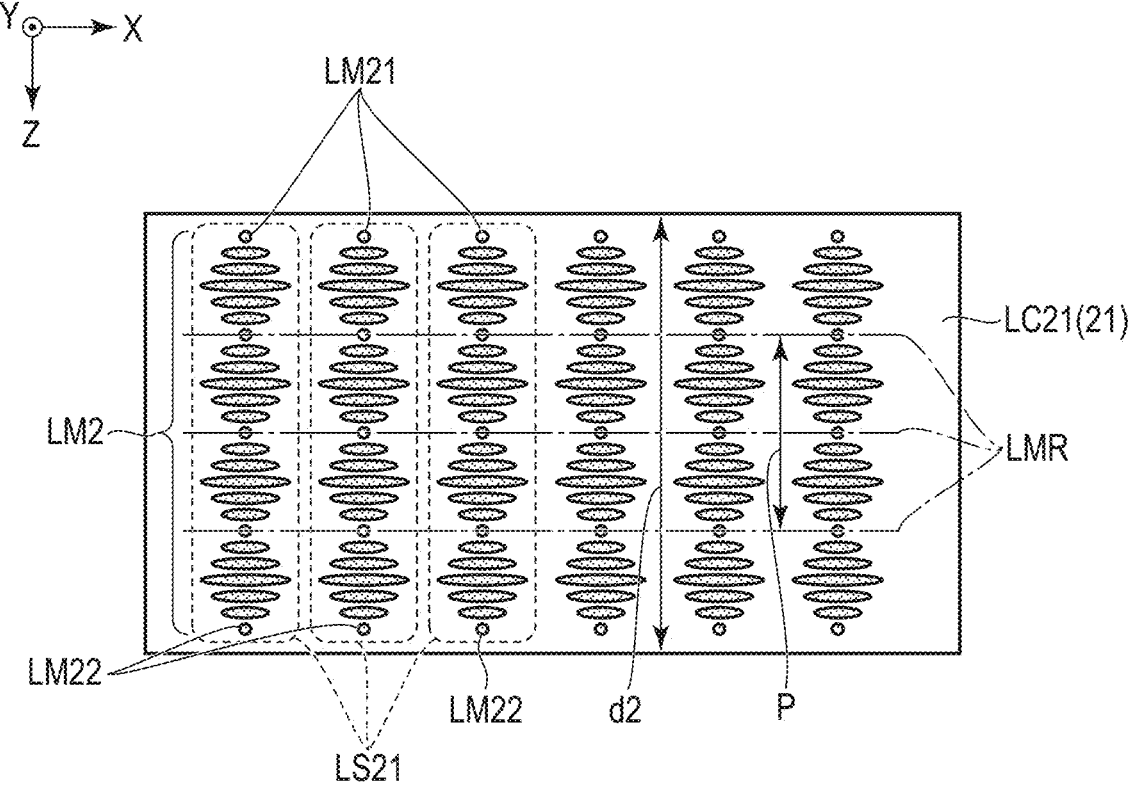
F I G. 19

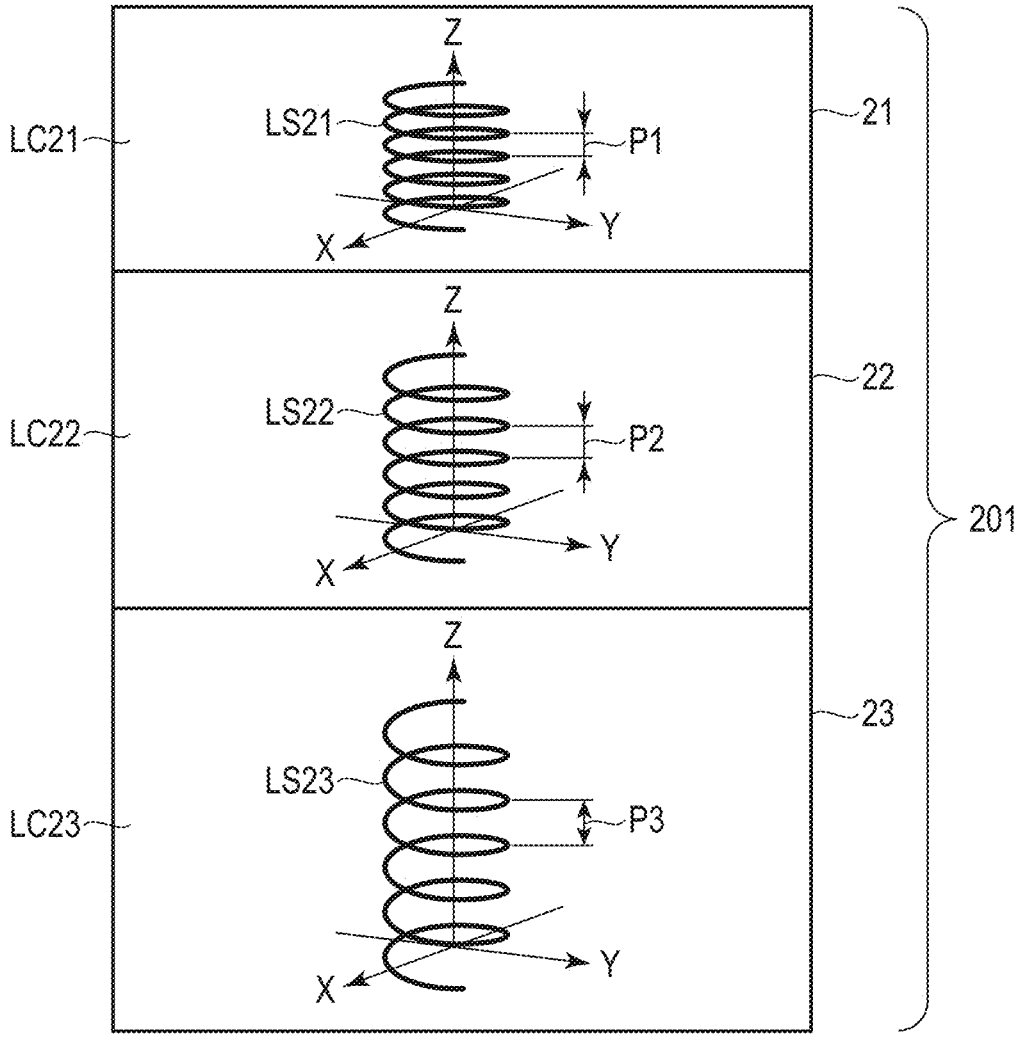
F I G. 20

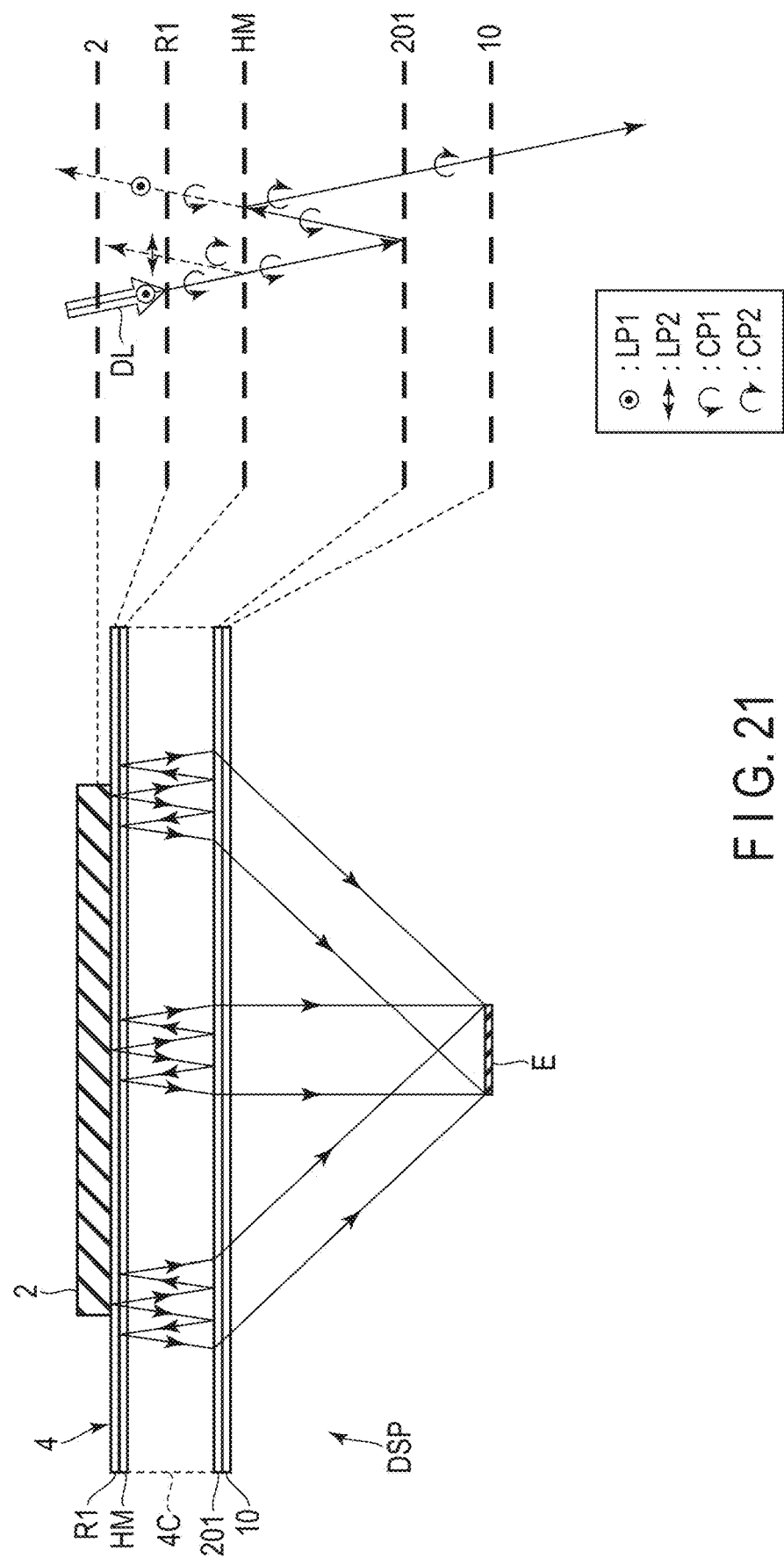
F I G. 21

LENS PORTION AND DISPLAY DEVICE

CROSS-REFERENCE TO RELATED APPLICATIONS

This application is based upon and claims the benefit of priority from Japanese Patent Application No. 2021-203401, filed Dec. 15, 2021, the entire contents of which are incorporated herein by reference.

FIELD

Embodiments described herein relate generally to a lens portion and a display device.

BACKGROUND

In recent years, a technique of providing, for example, virtual reality (VR) using a head-mounted display mounted on a user's head has been focused. The head-mounted display is configured such that an image is displayed on a display provided in front of user's eyes. The user wearing the head-mounted display can experience virtual reality space with a sense of reality.

Demand for thinning and reduction in weight in such a head-mounted display has been increased.

BRIEF DESCRIPTION OF THE DRAWINGS

FIG. 3 is a cross-sectional view showing example 1 of the display device DSP.

FIG. 4 is a plan view showing an example of an illumination device 3 which can be applied to the display device DSP shown in FIG. 3.

FIG. 9 is a cross-sectional view showing an example of the first lens element 11 and the second lens element 12.

FIG. 10 is a view showing an example of the alignment pattern in the first liquid crystal layer LC11 and the second liquid crystal layer LC12 shown in FIG. 9.

FIG. 11 is a graph illustrating wavelength characteristics of the liquid crystal layers constituting the lens elements.

FIG. 12 is a view illustrating an optical action of the display device DSP.

FIG. 13A is a cross-sectional view showing a second configuration example of the lens portion 10 shown in FIG. 3.

FIG. 13B is a cross-sectional view showing the other configuration example of the lens portion 10 shown in FIG. 3.

FIG. 14 is a view illustrating the lens action of the lens portion 10 shown in FIG. 13A.

FIG. 15 is a graph illustrating wavelength characteristics of the first phase conversion element PC1 and the second phase conversion element PC2.

FIG. 16 is a graph illustrating the wavelength characteristics of the liquid crystal layer constituting the lens element.

FIG. 17 is a cross-sectional view showing example 2 of the display device DSP.

FIG. 18 is a cross-sectional view showing a configuration example of the first selective reflection portion 201 shown in FIG. 17.

FIG. 19 is a cross-sectional view showing an example of the first optical element 21 shown in FIG. 18.

FIG. 20 is a view illustrating the first optical element 21, the second optical element 22, and the third optical element 23 shown in FIG. 18.

FIG. 21 is a view illustrating the optical action of the display device DSP.

DETAILED DESCRIPTION

Figure 1:
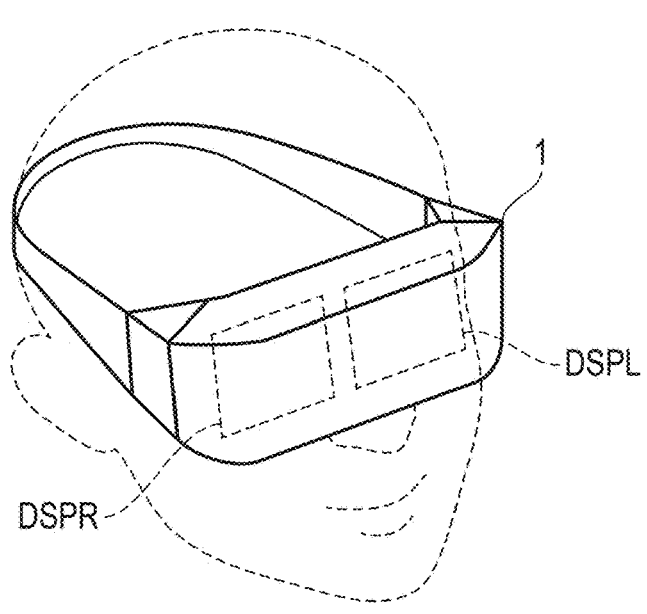
FIG. 1 is a perspective view showing an example of an appearance of a head-mounted display 1 to which a display device of the embodiments is applied.

In general, according to one embodiment, the following lens portion can be provided.

(1) A lens portion comprising:

a first lens element having a lens action of converging while converting first circularly polarized light of a first wavelength into second circularly polarized light of a reverse direction; and a second lens element stacked on the first lens element and having a lens action of converging while converting the second circularly polarized light of the first wavelength into the first circularly polarized light of the first wavelength, wherein each of the first lens element and the second lens element includes a liquid crystal layer cured in a state in which alignment directions of a plurality of liquid crystal molecules containing first liquid crystal molecules and second liquid crystal molecules are fixed, the liquid crystal layer includes a first annular area in which the first liquid crystal molecules are aligned in a same direction and a second annular area in which the second liquid crystal molecules are aligned in a same direction outside the first annular area, in planar view, a circle surrounding the first annular area and a circle surrounding the second annular area have same centers, an alignment direction of the first liquid crystal molecules is different from an alignment direction of the second liquid crystal molecules, the first annular area of the first lens element overlaps the first annular area of the second lens element, and the alignment direction of the first liquid crystal molecules of the first lens element is line symmetry with the alignment direction of the first liquid crystal molecules of the second lens element, with respect to a line passing the centers, in planar view.

(2) A lens portion comprising:

a first lens element having a lens action of converging while converting first circularly polarized light of a first wavelength into second circularly polarized light of a reverse direction;

a second lens element having a lens action of converging while converting first circularly polarized light of a second wavelength different from the first wavelength into second circularly polarized light of a reverse direction; and a third lens element having a lens action of converging while converting first circularly polarized light of a third wavelength different from the first wavelength and the second wavelength into second circularly polarized light of a reverse direction, wherein when n is an integer of 1 or more, the first lens element has a phase difference $(2n-1)\pi$ for the first wavelength and a phase difference $2n\pi$ for the second wavelength and the third wavelength, the second lens element has a phase difference $(2n-1)\pi$ for the second wavelength and a phase difference $2n\pi$ for the first wavelength and the third wavelength, the third lens element has a phase difference $(2n-1)\pi$ for the third wavelength and a phase difference $2n\pi$ for the first wavelength and the second wavelength, in the first to third lens elements, the phase difference for the second wavelength is smaller than the phase difference for the first wavelength, the phase difference for the third wavelength is smaller than the phase difference for the second wavelength, each of the first to third lens elements includes a liquid crystal layer cured in a state in which alignment directions of a plurality of liquid crystal molecules containing first liquid crystal molecules and second liquid crystal molecules are fixed, the liquid crystal layer includes a first annular area in which the first liquid crystal molecules are aligned in a same direction and a second annular area in which the second liquid crystal molecules are aligned in a same direction outside the first annular area, in planar view, a circle surrounding the first annular area and a circle surrounding the second annular area have same centers, and an alignment direction of the first liquid crystal molecules is different from an alignment direction of the second liquid crystal molecules.

(3) A lens portion comprising:

a first lens element having a lens action of converging while converting first circularly polarized light of a first wavelength into second circularly polarized light of a reverse direction, converging while converting first circularly polarized light of a second wavelength different from the first wavelength into second circularly polarized light of a reverse direction, and converging while converting first circularly polarized light of a third wavelength different from the first wavelength and the second wavelength into second circularly polarized light of a reverse direction;

a second lens element having a lens action of converging while converting the first circularly polarized light of the first wavelength into the second circularly polarized light, converging while converting the first circularly polarized light of the second wavelength into the second circularly polarized light, and diverging while converting the second circularly polarized light of the third wavelength into the first circularly polarized light;

a third lens element having a lens action of converging while converting the first circularly polarized light of the first wavelength into the second circularly polarized light, diverging while converting the second circularly polarized light of the second wavelength into the first circularly polarized light, and diverging while converting the second circularly polarized light of the third wavelength into the first circularly polarized light;

a first phase conversion element arranged between the first lens element and the second lens element, and having a phase difference $(2n-1)\pi$ for the first wavelength and the second wavelength and a phase difference $2n\pi$ for the third wavelength when n is an integer of 1 or more; and a second phase conversion element arranged between the second lens element and the third lens element, and having a phase difference $(2n-1)\pi$ for the first wavelength and the third wavelength and a phase difference $2n\pi$ for the second wavelength, wherein in the first phase conversion element and the second phase conversion element, the phase difference for the second wavelength is smaller than the phase difference for the first wavelength, the phase difference for the third wavelength is smaller than the phase difference for the second wavelength, the first wavelength is shorter than the second wavelength, the second wavelength is shorter than the third wavelength, each of the first to third lens elements includes a liquid crystal layer cured in a state in which alignment directions of a plurality of liquid crystal molecules containing first liquid crystal molecules and second liquid crystal molecules are fixed, the liquid crystal layer includes a first annular area in which the first liquid crystal molecules are aligned in a same direction and a second annular area in which the second liquid crystal molecules are aligned in a same direction outside the first annular area, in planar view, a circle surrounding the first annular area and a circle surrounding the second annular area have same centers, and an alignment direction of the first liquid crystal molecules is different from an alignment direction of the second liquid crystal molecules.

According to another embodiment, the following display device can be provided.

(4) A display device comprising:

a display panel including a polarizer and being configured to emit display light of linearly polarized light;

a semi-transparent layer;

a first retardation film arranged between the display panel and the semi-transparent layer;

a reflective polarizer configured to transmit first linearly polarized light and to reflect second linearly polarized light orthogonal to the first linearly polarized light;

a second retardation film arranged between the semi-transparent layer and the reflective polarizer;

the lens portion of (1); and a third retardation film arranged between the reflective polarizer and the lens portion, wherein the lens portion is separated from the reflective polarizer, and the first retardation film, the second retardation film, and the third retardation film are quarter-wave plates.

(5) A display device comprising:

a display panel including a polarizer and being configured to emit display light of linearly polarized light;

a semi-transparent layer;

a first retardation film arranged between the display panel and the semi-transparent layer;

the lens portion of (1); and a first selective reflection portion arranged between the semi-transparent layer and the lens portion and separated from the semi-transparent layer, wherein the lens portion is separated from the semi-transparent layer, the first retardation film is a quarter-wave plate, and the first selective reflection portion comprises a first optical element including a first cholesteric liquid crystal layer that reflects first circularly polarized light of a first wavelength toward the semi-transparent layer and transmits second circularly polarized light of a reverse direction from the first circularly polarized light of the first wavelength.

(6) A display device comprising:

a display panel including a polarizer and being configured to emit display light of linearly polarized light;

a semi-transparent layer;

a first retardation film arranged between the display panel and the semi-transparent layer;

a reflective polarizer configured to transmit first linearly polarized light and to reflect second linearly polarized light orthogonal to the first linearly polarized light;

a second retardation film arranged between the semi-transparent layer and the reflective polarizer;

the lens portion of (2) or (3); and a third retardation film arranged between the reflective polarizer and the lens portion, wherein the lens portion is separated from the reflective polarizer, and the first retardation film, the second retardation film, and the third retardation film are quarter-wave plates.

(7) A display device comprising:

a display panel including a polarizer and being configured to emit display light of linearly polarized light;

a semi-transparent layer;

a first retardation film arranged between the display panel and the semi-transparent layer;

the lens portion of (2) or (3); and a first selective reflection portion arranged between the semi-transparent layer and the lens portion and separated from the semi-transparent layer, wherein the lens portion is separated from the semi-transparent layer, the first retardation film is a quarter-wave plate, and the first selective reflection portion comprises:

a first optical element including a first cholesteric liquid crystal layer that reflects first circularly polarized light of a first wavelength toward the semi-transparent layer and transmits second circularly polarized light of a reverse direction from the first circularly polarized light of the first wavelength;

a second optical element stacked on the first optical element and including a second cholesteric liquid crystal layer that reflects first circularly polarized light of a second wavelength different from the first wavelength toward the semi-transparent layer and transmits second circularly polarized light of a reverse direction from the first circularly polarized light of the second wavelength; and a third optical element stacked on the second optical element and including a third cholesteric liquid crystal layer that reflects first circularly polarized light of a third wavelength different from the first wavelength and the second wavelength toward the semi-transparent layer and transmits second circularly polarized light of a reverse direction from the first circularly polarized light of the third wavelength.

(8) The display device of (7), wherein a helical pitch of the second cholesteric liquid crystal layer is larger than a helical pitch of the first cholesteric liquid crystal layer, and a helical pitch of the third cholesteric liquid crystal layer is larger than the helical pitch of the second cholesteric liquid crystal layer.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, an X-axis, a Y-axis and a Z-axis orthogonal to each other are described to facilitate understanding as needed. A direction along the X-axis is referred to as a first direction X, a direction along the Y-axis is referred to as a second direction Y, and a direction along the Z-axis is referred to as a third direction Z. A plane defined by the X-axis and the Y-axis is referred to as an X-Y plane, and viewing the X-Y plane is referred to as planar view.

FIG. 1 is a perspective view showing an example of an appearance of a head-mounted display 1 to which a display device of the embodiments is applied.

The head-mounted display 1 comprises, for example, a display device DSPR for a right eye and a display device DSPL for a left eye. In a state in which the user wears the head-mounted display 1 on the head, the display device DSPR is arranged to be located in front of the user's right eye, and the display device DSPL is arranged to be located in front of the user's left eye.

Figure 2:
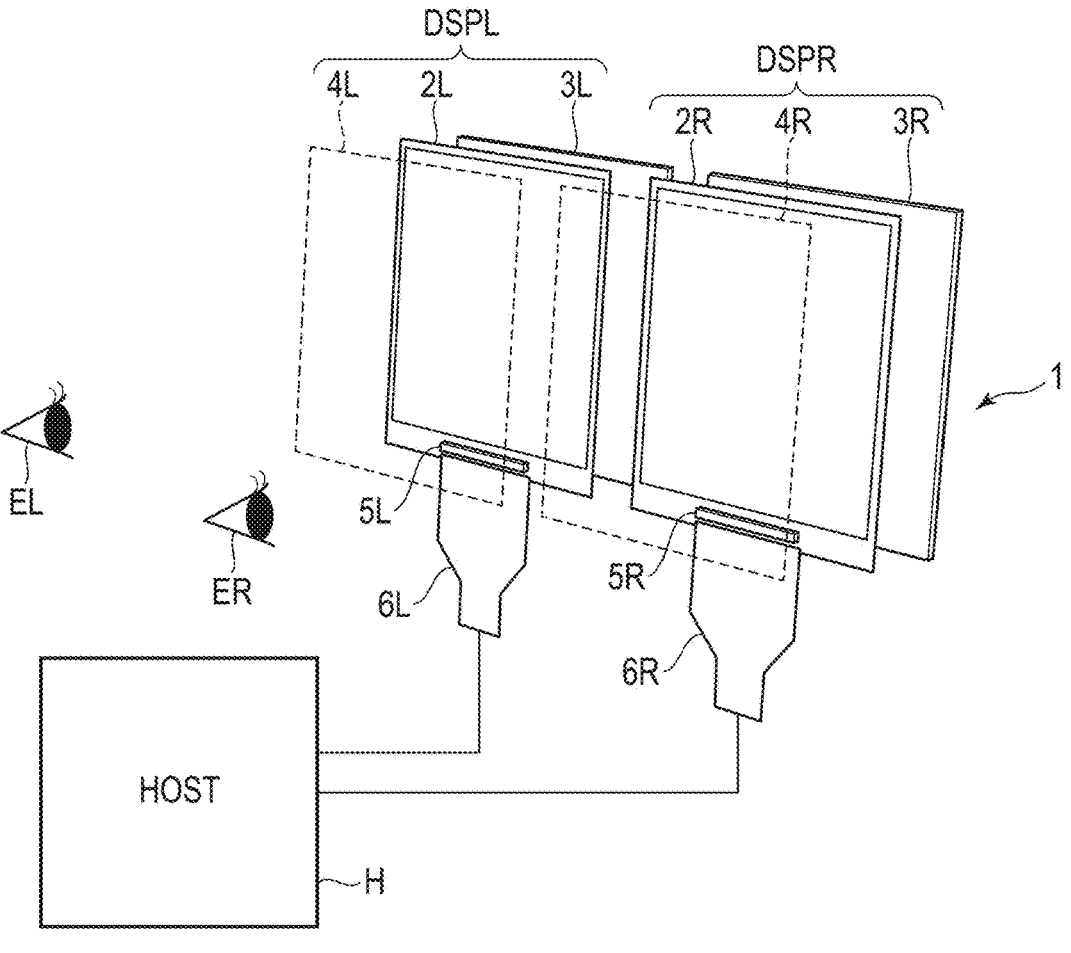
FIG. 2 is a view illustrating a summary of a configuration example of the head-mounted display 1 shown in FIG. 1.

FIG. 2 is a view illustrating a summary of a configuration example of the head-mounted display 1 shown in FIG. 1.

The display device DSPR is configured substantially similarly to the display device DSPL.

The display device DSPR comprises a display panel 2R, an illumination device 3R, and an optical system 4R represented by a dotted line. The illumination device 3R is arranged on a back side of the display panel 2R and configured to illuminate the display panel 2R. The optical system 4R is arranged on a front side of the display panel 2R (or between the user's right eye ER and the display panel 2R) and configured to guide display light from the display panel 2R to the right eye ER.

The display panel 2R includes, for example, a liquid crystal panel and a polarizer. The display panel 2R is arranged between the illumination device 3R and the optical system 4R. For example, a driver IC chip 5R and a flexible printed circuit board 6R are connected to the display panel 2R. The driver IC chip 5R controls drive of the display panel 2R (particularly controls a display action of the display panel 2R).

The display device DSPL comprises a display panel 2L, an illumination device 3L, and an optical system 4L represented by a dotted line. The illumination device 3L is arranged on a back side of the display panel 2L and configured to illuminate the display panel 2L. The optical system 4L is arranged on a front side of the display panel 2L (or between the user's left eye EL and the display panel 2L) and configured to guide display light from the display panel 2L to the left eye EL.

The display panel 2L includes, for example, a liquid crystal panel and a polarizer. The display panel 2L is arranged between the illumination device 3L and the optical system 4L. For example, a driver IC chip 5L and a flexible printed circuit board 6L are connected to the display panel 2L. The driver IC chip 5L controls drive of the display panel 2L (particularly controls a display action of the display panel 2L).

The display panel 2R, the illumination device 3R, and the optical system 4R constituting the display device DSPR are constituted similarly to the display panel 2L, the illumination device 3L, and the optical system 4L constituting the display device DSPL, respectively.

In the display devices DSPR and DSPL according to the embodiments, the display panels 2R and 2L are not limited to the examples including the liquid crystal panels, but may include display panels comprising self-luminous light emitting elements such as organic electroluminescent (EL) devices, micro-LED, and mini-LED. When the display panels are the display panels comprising the light emitting elements, the illumination devices 3R and 3L are omitted. As described later in detail, the display panels 2R and 2L are configured to emit display light of linearly polarized light, and include polarizers as needed.

A host computer H provided outside is connected to each of the display panels 2L and 2R. The host computer H outputs image data corresponding to the images displayed on the display panels 2L and 2R. The image displayed on the display panel 2L is an image for the left eye (or an image to be visually recognized by the user's left eye EL). In addition, the image displayed on the display panel 2R is an image for the right eye (or an image to be visually recognized by the user's right eye ER).

For example, when the head-mounted display 1 is used for VR, the image for the left eye and the image for the right eye are images similar to each other, which reproduce the parallax of both eyes. When the image for the left eye displayed on the display panel 2L is visually recognized by the user's left eye EL and the image for the right eye displayed on the display panel 2R is visually recognized by the user's right eye ER, the user can grasp a stereoscopic space (three-dimensional space) as a virtual reality space.

Next, several examples of the display device DSP according to the embodiments will be described.

Example 1

FIG. 3 is a cross-sectional view showing example 1 of the display device DSP.

The display device DSP comprises a display panel 2, an illumination device 3, and an optical system 4. The display device DSP described herein can be applied to each of the above-described display devices DSPR and DSPL. The display panel 2 can be applied to each of the above-described display panels 2R and 2L. The illumination device 3 can be applied to each of the above-described illumination devices 3R and 3L. The optical system 4 can be applied to each of the above-described optical systems 4R and 4L.

The display panel 2 is formed in a flat plate shape extending along the X-Y plane. The display panel 2 comprises a first substrate SUB1, a second substrate SUB2, a liquid crystal layer LC, a first polarizer PL1, and a second polarizer PL2. The liquid crystal layer LC is held between the first substrate SUB1 and the second substrate SUB2, and is sealed by a sealant SE. The first polarizer PL1 is arranged between the illumination device 3 and the first substrate SUB1. The second polarizer PL2 is arranged between the second substrate SUB2 and the optical system 4. The display area DA of the display panel 2 is configured to selectively modulate illumination light from the illumination device 3. Part of the illumination light is transmitted through the second polarizer PL2 and converted into the display light DL of the linearly polarized light.

The display panel 2 is not limited to a liquid crystal panel in not only example 1 described herein, but also the other examples. When the display panel 2 is a display panel comprising a self-luminous light emitting element, the illumination device 3 is omitted as described above. In addition, in this case, the display light DL emitted from the light emitting element is transmitted through the polarizer and converted into the display light DL of the linearly polarized light.

The optical system 4 comprises a first structure 4A and a second structure 4B. The first structure 4A is spaced apart from the second structure 4B. In the example shown in FIG. 3, an air layer 4C is provided between the first structure 4A and the second structure 4B. The first structure 4A is arranged between the display panel 2 and the second structure 4B (or between the display panel 2 and the air layer 4C).

The first structure 4A comprises a first retardation film R1, a semi-transparent layer HM, and a second retardation film R2. The first retardation film R1 and the second retardation film R2 are quarter-wave plates, assigning a quarter-wave phase difference to the transmitted light. The semi-transparent layer HM transmits part of the incident light and reflects the other light. For example, the semi-transparent layer HM is a thin film formed of a metal material such as aluminum or silver. In addition, the transmittance of the semi-transparent layer HM is approximately 50%.

The first retardation film R1, the semi-transparent layer HM, and the second retardation film R2 extend in a range wider than the display area DA in the X-Y plane. In addition, the first retardation film R1, the semi-transparent layer HM, and the second retardation film R2 are stacked in this order along the third direction Z. The first retardation film R1 is in contact with the display panel 2 (or the second polarizer PL2), the semi-transparent layer HM is in contact with the first retardation film R1, the second retardation film R2 is in contact with the semi-transparent layer HM, the first retardation film R1 is arranged between the display panel 2 and the semi-transparent layer HM, and the semi-transparent layer HM is arranged between the first retardation film R1 and the second retardation film R2.

The second structure 4B comprises a reflective polarizer PR, a third retardation film R3, and a lens portion 10. The reflective polarizer PR transmits first linearly polarized light of the incident light, and reflects second linearly polarized light orthogonal to the first linearly polarized light. For example, the reflective polarizer PR is a polarizer of a multi-layered thin film type or a wire grid type. The third retardation film R3 is a quarter-wave plate, assigning a quarter-wave phase difference to transmitted light.

The lens portion 10 comprises a plurality of lens elements, which will be described below in detail. The lens elements have a lens action that assigns a half-wavelength phase difference to light of a specific wavelength and converges or diverges either the first circularly polarized light or the second circularly polarized light. The second circularly polarized light is the circularly polarized light in which the rotation is opposite to the first circularly polarized light.

The reflective polarizer PR, the third retardation film R3, and the lens portion 10 extend in a range wider than the display area DA in the X-Y plane. In addition, the reflective polarizer PR, the third retardation film R3, and the lens portion 10 are stacked in this order in the third direction Z. The third retardation film R3 is in contact with the reflective polarizer PR, the lens portion 10 is in contact with the third retardation film R3, the second retardation film R2 is arranged between the semi-transparent layer HM and the reflective polarizer PR, and the third retardation film R3 is arranged between the reflective polarizer PR and the lens portion 10. The reflective polarizer PR is separated from the second retardation film R2 and is opposed to the second retardation film R2 through the air layer 4C in the third direction Z.

The display panel 2 and the first retardation film R1 are desirably in close contact with each other with no air layer interposed therebetween. In addition, the first retardation film R1, the semi-transparent layer HM, and the second retardation film R2 constituting the first structure 4A are desirably in close contact with one another with no air layer interposed between. Furthermore, the reflective polarizer PR, the third retardation film R3, and the lens portion 10 constituting the second structure 4B are desirably in close contact with one another with no air layer interposed between. Undesired reflection or refraction in the interface between the members can be thereby suppressed.

The first retardation film R1, the second retardation film R2, and the third retardation film R3 assign a quarter-wave phase difference to, for example, at least the light of the green wavelength, but are not limited to this example. For example, wide-band retardation films that also assign an approximately quarter-wave phase difference to light of the red wavelength, the green wavelength, and the blue wavelength may be used as the first retardation film R1, the second retardation film R2, and the third retardation film R3. As such a wide-band type retardation film, for example, a retardation film formed by bonding a quarter-wave plate and a half-wave plate in a state in which a slow axis of the quarter-wave plate and a slow axis of the half-wave plate forms a predetermined angle can be used. The wavelength dependency in the first retardation film R1, the second retardation film R2, and the third retardation film R3 can be thereby relaxed.

FIG. 4 is a plan view showing an example of an illumination device 3 which can be applied to the display device DSP shown in FIG. 3.

Only main portions of the illumination device 3 are shown in FIG. 4.

The illumination device 3 comprises a light guide LG and a plurality of light emitting elements LD. Each of the plurality of light emitting elements LD is opposed to a side surface LGS of the light guide LG in the first direction or the second direction. The light emitting element LD includes a first light emitting element LD1 emitting light of a first wavelength, a second light emitting element LD2 emitting light of a second wavelength, and a third light emitting element LD3 emitting light of a third wavelength. The first light emitting element LD1, the second light emitting element LD2, and the third light emitting element LD3 are arranged with intervals. The first, second, and third wavelengths are different from each other. For example, the first wavelength corresponds to the blue wavelength B, the second wavelength corresponds to the green wavelength G, and the third wavelength corresponds to the red wavelength R, but are not limited to this example.

The light emitted from the light emitting element LD desirably has a narrow spectral width (or a high color purity). For this reason, a laser light source is desirably used as the light emitting element LD. A center wavelength of the blue laser light emitted from the first light emitting element (first laser element) LD1 is referred to as λb, a center wavelength of the green laser light emitted from the second light emitting element (second laser element) LD2 is referred to as λg, and a center wavelength of the red laser light emitted from the third light emitting element (third laser element) LD3 is referred to as λr.

The illumination device 3 is not limited to the structure shown in FIG. 4, but may be a direct type illumination device comprising a plurality of light emitting elements LD opposed to the display panel in the third direction.

«First Configuration Example of Lens Portion»

Figure 5:
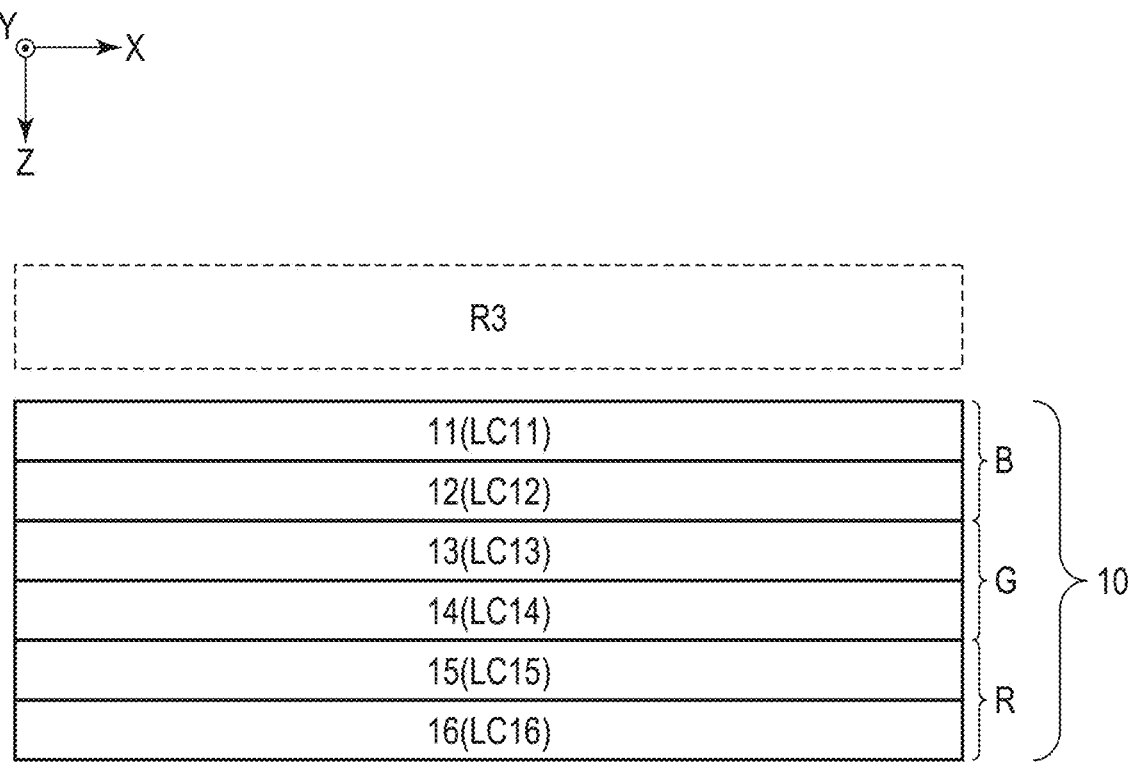
FIG. 5 is a cross-sectional view showing a first configuration example of the lens portion 10 shown in FIG. 3.

FIG. 5 is a cross-sectional view showing a first configuration example of the lens portion 10 shown in FIG. 3.

The lens portion 10 comprises a first lens element 11 including a first liquid crystal layer LC11, a second lens element 12 including a second liquid crystal layer LC12, a third lens element 13 including a third liquid crystal layer LC13, a fourth lens element 14 including a fourth liquid crystal layer LC14, a fifth lens element 15 including a fifth liquid crystal layer LC15, and a sixth lens element 16 including a sixth liquid crystal layer LC16.

For example, the first lens element 11 is opposed to the third retardation film R3 in the third direction Z. In addition, the first lens element 11, the second lens element 12, the third lens element 13, the fourth lens element 14, the fifth lens element 15, and the sixth lens element 16 are stacked in this order along the third direction Z, but the stacking order may be different from the example shown in the drawing.

The first lens element 11 and the second lens element 12 have a lens action of assigning the ½ wavelength phase difference to light of the first wavelength and converging or diverging either of the first circularly polarized light and the second circularly polarized light of the first wavelength.

For example, the first lens element 11 has a lens action of converting first circularly polarized light B1 of the first wavelength (for example, the blue wavelength B) transmitted through the third retardation film R3 into second circularly polarized light B2 of the first wavelength while converging the second circularly polarized light B2. In addition, the second lens element 12 has a lens action of converting the second circularly polarized light B2 transmitted through the first lens element 11 into the first circularly polarized light B1 while converging the first circularly polarized light B1.

The third lens element 13 and the fourth lens element 14 have a lens action of assigning a ½ wavelength phase difference to the light of the second wavelength and converging or diverging either of the first circularly polarized light and the second circularly polarized light of the second wavelength.

For example, the third lens element 13 has a lens action of converting first circularly polarized light G1 of the second wavelength (for example, the green wavelength G) transmitted through the third retardation film R3 into second circularly polarized light G2 of the second wavelength while converging the second circularly polarized light G2. In addition, the fourth lens element 14 has a lens action of converting the second circularly polarized light G2 transmitted through the third lens element 13 into the first circularly polarized light G1 while converging the first circularly polarized light G1.

The fifth lens element 15 and the sixth lens element 16 have a lens action of assigning a ½ wavelength phase difference to the light of the third wavelength and converging or diverging either of the first circularly polarized light and the second circularly polarized light of the third wavelength.

For example, the fifth lens element 15 has a lens action of converting first circularly polarized light R1 of the third wavelength (for example, the red wavelength R) transmitted through the third retardation film R3 into second circularly polarized light R2 of the third wavelength while converging the second circularly polarized light R2. In addition, the sixth lens element 16 has a lens action of converting the second circularly polarized light R2 transmitted through the fifth lens element 15 into the first circularly polarized light R1 while converging the first circularly polarized light R1.

Figure 6:
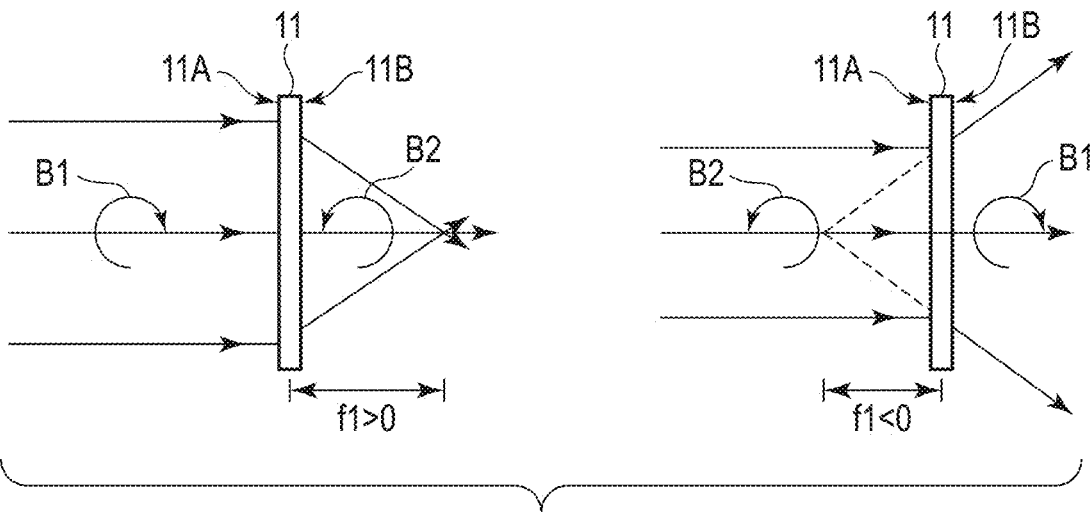
FIG. 6 is a view illustrating the lens action of the first lens element 11 shown in FIG. 5.

FIG. 6 is a view illustrating the lens action of the first lens element 11 shown in FIG. 5.

The first lens element 11 has a first upper surface 11A and a first lower surface 11B. A case where the first circularly polarized light B1 and the second circularly polarized light B2 of the first wavelength are transmitted from the first upper surface 11A toward the first lower surface 11B will be described.

As shown on the left side of FIG. 6, when the first circularly polarized light B1 is made incident on the first lens element 11, the first lens element 11 has a positive focal length f1, and the transmitted light of the first lens element 11 is converted into the second circularly polarized light B2 and converged.

As shown on the right side of FIG. 6, when the second circularly polarized light B2 is made incident on the first lens element 11, the first lens element 11 has a negative focal length f1, and the transmitted light of the first lens element 11 is converted into the first circularly polarized light B1 and diverged.

The configuration of the second lens element 12 is substantially the same as that of the first lens element 11. In other words, the second lens element 12 also exerts the same lens action as that illustrated in FIG. 6 when the first circularly polarized light B1 and the second circularly polarized light B2 of the first wavelength are transmitted from the second upper surface 12A toward the second lower surface 12B.

Figure 7:
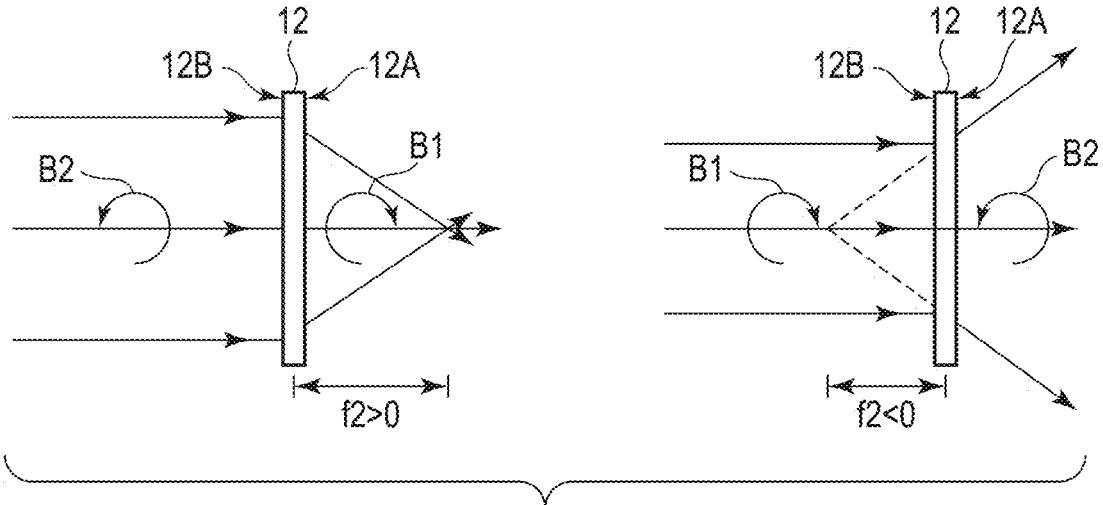
FIG. 7 is a view illustrating the lens action of the second lens element 12 shown in FIG. 5.

FIG. 7 is a view illustrating the lens action of the second lens element 12 shown in FIG. 5.

The second lens element 12 has a second upper surface 12A and a second lower surface 12B. A case where the first circularly polarized light B1 and the second circularly polarized light B2 of the first wavelength are transmitted from the second lower surface 12B toward the second upper surface 12A will be described. In other words, the second lens element 12 shown in FIG. 7 corresponds to a lens element obtained by turning the first lens element 11 shown in FIG. 6 upside down.

As shown on the left side of FIG. 7, when the second circularly polarized light B2 is made incident on the second lens element 12, the second lens element 12 has a positive focal length f2, and the transmitted light of the second lens element 12 is converted into the first circularly polarized light B1 and converged.

As shown on the right side of FIG. 7, when the first circularly polarized light B1 is made incident on the second lens element 12, the second lens element 12 has a negative focal length f2, and the transmitted light of the second lens element 12 is converted into the second circularly polarized light B2 and diverged.

Figure 8:
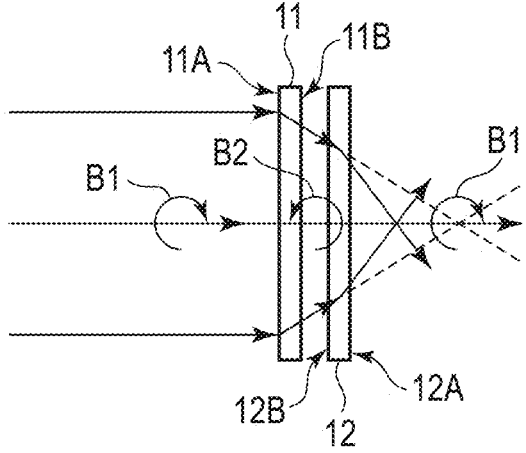
FIG. 8 is a view illustrating the lens action of the first lens element 11 and the second lens element 12 shown in FIG. 5.

FIG. 8 is a view illustrating the lens action of the first lens element 11 and the second lens element 12 shown in FIG. 5.

The first lens element 11 and the second lens element 12 are aligned in the direction of travel of the light. The first lower surface 11B is opposed to the second lower surface 12B. At this time, a combined focal length fs of the first lens element 11 and the second lens element 12, can be represented by equation (1) shown in the drawing, based on the positive focal length f1 of the first lens element 11, the positive focal length f2 of the second lens element 12, and an inter-lens distance d of the first lens element 11 and the second lens element 12. In other words, when the focal length f1 is equal to the focal length f2 and the inter-lens distance d is very small, the combined focal length fs is approximately ½ of the focal length f1. This means that the focal length can be shortened by combining the first lens element 11 and the second lens element 12 as compared to a case where the first lens element 11 is used alone.

The combination of the first lens element 11 and the second lens element 12 has been described above with reference to FIG. 6 to FIG. 8, but the combination of the third lens element 13 and the fourth lens element 14 and the combination of the fifth lens element 15 and the sixth lens element 16 also exert the same lens action as the combination of the first lens element 11 and the second lens element 12.

In other words, the fourth lens element 14 corresponds to a lens element obtained by turning the third lens element 13 upside down. The focal length can be shortened by combining the third lens element 13 and the fourth lens element 14 as compared to a case where the third lens element 13 is used alone.

In addition, the sixth lens element 16 corresponds to a lens element obtained by turning the fifth lens element 15 upside down. The focal length can be shortened by combining the fifth lens element 15 and the sixth lens element 16 as compared to a case where the fifth lens element 15 is used alone.

FIG. 9 is a cross-sectional view showing an example of the first lens element 11 and the second lens element 12.

The first liquid crystal layer LC11 of the first lens element 11 and the second liquid crystal layer LC12 of the second lens element 12 will be described. Although each of the first lens element 11 and the second lens element 12 may comprise a transparent substrate and an alignment film, their illustration and description are omitted.

Each of the first liquid crystal layer LC11 and the second liquid crystal layer LC12 has an equal thickness d along the third direction Z. Each of the first liquid crystal layer LC11 and the second liquid crystal layer LC12 has nematic liquid crystal whose alignment direction along the third direction Z is parallel.

Each of the first liquid crystal layer LC11 and the second liquid crystal layer LC12 includes a plurality of liquid crystal structures LS1. When one liquid crystal structure LS1 is focused, the liquid crystal structure LS1 contains liquid crystal molecule LM11 located on one end side and liquid crystal molecule LM12 on the other end side. The alignment direction of the liquid crystal molecule LM11 is substantially the same as the alignment direction of the liquid crystal molecule LM12. In addition, the alignment directions of the other liquid crystal molecules LM1 between the liquid crystal molecule LM11 and the liquid crystal molecule LM12 are also substantially the same as the alignment directions of the liquid crystal molecule LM11. The alignment directions of the liquid crystal molecules LM1 correspond to directions of longer axes of the liquid crystal molecules in the X-Y plane.

In addition, a plurality of liquid crystal structures LS1 adjacent in the first direction X have alignment directions different from each other. Similarly, a plurality of liquid crystal structures LS1 adjacent in the second direction Y also have alignment directions different from each other. The alignment directions of the plurality of liquid crystal molecules LM11 aligned along the first direction X change continuously (or linearly).

Each of the first liquid crystal layer LC11 and the second liquid crystal layer LC12 is cured in a state in which the alignment directions of the liquid crystal molecules LM1 containing the liquid crystal molecules LM11 and the liquid crystal molecules LM12 are fixed. In other words, the alignment directions of the liquid crystal molecules LM1 are not controlled depending on the electric field. Similarly, each of the third liquid crystal layer LC13 of the third lens element 13, the fourth liquid crystal layer LC14 of the fourth lens element 14, the fifth liquid crystal layer LC15 of the fourth lens element 15, and the sixth liquid crystal layer LC16 of the sixth lens element LC16 is cured in a state in which the alignment directions of the liquid crystal molecules LM1 containing the liquid crystal molecules LM11 and the liquid crystal molecules LM12 are fixed.

For this reason, the first lens element 11, the second lens element 12, the third lens element 13, the fourth lens element 14, the fifth lens element 15, and the sixth lens element 16 do not comprise electrodes for alignment control.

In each of the first liquid crystal layer LC11, the second liquid crystal layer LC12, the third liquid crystal layer LC13, the fourth liquid crystal layer LC14, the fifth liquid crystal layer LC15, and the sixth liquid crystal layer LC16, when the refractive anisotropy or birefringence (difference between the refractive index ne for extraordinary light and the refractive index no for ordinary light) is referred to as Δn and thickness is referred to as d, the phase difference Γ is set to be equivalent to ½ of a specified wavelength λ.

In other words, the phase difference Γ is defined by the following equation.

$$\Gamma = (2\pi/\lambda) \cdot (\Delta n \cdot d) = \pi \qquad (2)$$

For example, when the center wavelength λb of the blue laser light emitted from the first light emitting element LD1 is referred to as a first wavelength, the phase difference Γ of each of the first liquid crystal layer LC11 and the second liquid crystal layer LC12 is set to be equivalent to a half of the wavelength λb.

Similarly, when the center wavelength λg of the green laser light emitted from the second light emitting element LD2 is referred to as a second wavelength, the phase difference Γ of each of the third liquid crystal layer LC13 and the fourth liquid crystal layer LC14 is set to be equivalent to a half of the wavelength λg.

Furthermore, when the center wavelength λr of the red laser light emitted from the third light emitting element LD3 is referred to as a third wavelength, the phase difference Γ of each of the fifth liquid crystal layer LC15 and the sixth liquid crystal layer LC16 is set to be equivalent to a half of the wavelength λr.

The refractive anisotropy Δn and thickness d of the first liquid crystal layer LC11 are the same as those of the second liquid crystal layer LC12, the refractive anisotropy Δn and thickness d of the third liquid crystal layer LC13 are the same as those of the fourth liquid crystal layer LC14, and the refractive anisotropy Δn and thickness d of the fifth liquid crystal layer LC15 are the same as those of the sixth liquid crystal layer LC16. However, the refractive anisotropies Δn of the first liquid crystal layer LC11, the third liquid crystal layer LC13, and the fifth liquid crystal layer LC15 may be different from each other. In addition, the thicknesses d of the first liquid crystal layer LC11, the third liquid crystal layer LC13, and the fifth liquid crystal layer LC15 may be different from each other.

FIG. 10 is a view showing an example of the alignment pattern in the first liquid crystal layer LC11 and the second liquid crystal layer LC12 shown in FIG. 9.

An example of the spatial phase in the X-Y plane, of each of the first liquid crystal layer LC11 and the second liquid crystal layer LC12 is shown in FIG. 10. The spatial phase shown in this drawing is the alignment direction of the liquid crystal molecules LM1 contained in the liquid crystal structure LS1.

The spatial phases match in concentric circles represented by dotted lines in the drawing. Alternatively, the alignment directions of the liquid crystal molecules LM11 are parallel to each other in an annular area surrounded by two adjacent concentric circles. However, the alignment directions of the liquid crystal molecules LM11 in the adjacent annular areas are different from each other.

For example, the first liquid crystal layer LC11 includes a first annular area C1 and a second annular area C2 in the X-Y plane. The second annular area C2 is located outside the first annular area C1. The first annular area C1 is constituted by a plurality of first liquid crystal molecules LM111 aligned in the same direction. In addition, the second annular area C2 is constituted by a plurality of second liquid crystal molecules LM112 aligned in the same direction. The alignment direction of the first liquid crystal molecules LM111 is different from the alignment direction of the second liquid crystal molecules LM112.

In addition, the alignment directions of the liquid crystal molecules LM1 arranged in a radial direction from the center O of the concentric circles are different from each other and are varied continually. In other words, the spatial phases of the first liquid crystal layer LC11 are different in the radial direction and are varied continuously in the X-Y plane shown in the drawing.

Similarly, the second liquid crystal layer LC12 includes a first annular area C1 and a second annular are C2 in the X-Y plane. The second annular area C2 is located outside the first annular area C1. The first annular area C1 is constituted by a plurality of first liquid crystal molecules LM111 aligned in the same direction. In addition, the second annular area C2 is constituted by a plurality of second liquid crystal molecules LM112 aligned in the same direction. The alignment direction of the first liquid crystal molecules LM111 is different from the alignment direction of the second liquid crystal molecules LM112.

In addition, the alignment directions of the liquid crystal molecules LM1 arranged in a radial direction from the center O of the concentric circles are different from each other and are varied continually. In other words, the spatial phases of the second liquid crystal layer LC12 are different in the radial direction and are varied continuously in the X-Y plane shown in the drawing.

When the relationship between the first liquid crystal layer LC11 and the second liquid crystal layer LC12 is focused, the first annular area C1 of the second liquid crystal layer LC12 overlaps with the first annular area C1 of the first liquid crystal layer LC11 in the third direction Z. The second annular area C2 of the second liquid crystal layer LC12 overlaps with the second annular area C2 of the first liquid crystal layer LC11 in the third direction Z. The center O of the circle surrounding the first annular area C1 and the second annular area C2 in the second liquid crystal layer LC12 overlaps with the center O of the circle surrounding the first annular area C1 and the second annular area C2 in the first liquid crystal layer LC11, in the third direction Z.

However, the first liquid crystal molecules LM111 in the first annular area C1 of the second liquid crystal layer LC12 are aligned in the direction different from the first liquid crystal molecules LM111 in the first annular area C1 of the first liquid crystal layer LC11, in the X-Y plane. In addition, the second liquid crystal molecules LM112 in the second annular area C2 of the second liquid crystal layer LC12 are aligned in a direction different from the second liquid crystal molecules LM112 in the second annular area C2 of the first liquid crystal layer LC11, in the X-Y plane.

Then, the alignment direction of the first liquid crystal molecules LM111 of the second liquid crystal layer LC12 is line symmetry with the alignment direction of the first liquid crystal molecules LM111 of the first liquid crystal layer LC11 about the line OL passing through the center O, in the X-Y plane. In addition, the alignment direction of the second liquid crystal molecules LM112 of the second liquid crystal layer LC12 is line symmetry with the alignment direction of the second liquid crystal molecules LM112 of the first liquid crystal layer LC11 about the line OL, in the X-Y plane.

Thus, the first liquid crystal layer LC11 of the first lens element 11 described with reference to FIG. 9 and FIG. 10 exerts the lens action of focal length f1 as described with reference to FIG. 6, and the second liquid crystal layer LC12 of the second lens element 12 exerts the lens action of focal length f2 as described with reference to FIG. 7.

The first liquid crystal layer LC11 will be focused. When the focal length is simply referred to as f, the radius from the center O in the X-Y plane is referred to as r, and the inclination of the liquid crystal molecule LM1 at the position of the radius r from the center O is referred to as $\theta(r)$, a relationship of equation (3) in the drawing is established. In other words, the focal length f does not depend on the phase difference, but is different depending on the wavelength $\lambda$.

In short, even if the first liquid crystal layer LC11 is configured to exert the lens action of the focal length f for the light of the first wavelength, the first liquid crystal layer LC11 exerts the lens action of a focal length different from the focal length f for the light of the second and third wavelengths in some cases. For this reason, the first liquid crystal layer LC11 hardly exerts the lens action for the light of the second and third wavelengths while exerting the lens action of the focal length f for the light of the first wavelength. More specifically, this will be described with reference to FIG. 11.

The third liquid crystal layer LC13, the fourth liquid crystal layer LC14, the fifth liquid crystal layer LC15, and the sixth liquid crystal layer LC16 also include a plurality of annular areas in which the alignment directions of the liquid crystal molecules are parallel to each other, similarly to the first liquid crystal layer LC11, and the alignment directions of the liquid crystal molecules in the adjacent annular areas are different from each other.

The alignment pattern of the liquid crystal molecules LM1 in the third liquid crystal layer LC13 and the fourth liquid crystal layer LC14 is set to exert the lens action of the focal length f for the light of the second wavelength, based on the equation (3) in the drawing. In addition, the third liquid crystal layer LC13 and the fourth liquid crystal layer LC14 hardly exert the lens action for the light of the first and third wavelengths. More specifically, this will be described with reference to FIG. 11.

The alignment pattern of the liquid crystal molecules LM1 in the fifth liquid crystal layer LC15 and the sixth liquid crystal layer LC16 is set to exert the lens action of the focal length f for the light of the third wavelength, based on the equation (3) in the drawing. In addition, the fifth liquid crystal layer LC15 and the sixth liquid crystal layer LC16 hardly exert the lens action for the light of the first and second wavelengths. More specifically, this will be described with reference to FIG. 11.

FIG. 11 is a graph illustrating wavelength characteristics of the liquid crystal layers constituting the lens elements.

The upper part of FIG. 11 is a graph showing wavelength characteristics of the first liquid crystal layer LC11 and the second liquid crystal layer LC12 suitable for the first wavelength (blue wavelength: 450 nm). The middle part of FIG. 11 is a graph showing wavelength characteristics of the third liquid crystal layer LC13 and the fourth liquid crystal layer LC14 suitable for the second wavelength (green wavelength: 530 nm). The lower part of FIG. 11 is a graph showing wavelength characteristics of the fifth liquid crystal layer LC15 and the sixth liquid crystal layer LC16 suitable for the third wavelength (red wavelength: 630 nm).

In each graph showing the wavelength characteristics, the horizontal axis indicates a wavelength (nm) and the vertical axis indicates $\Delta n \cdot d$ (nm).

As described above, the first liquid crystal layer LC11 and the second liquid crystal layer LC12 are required to exert the lens action of the focal length f for the light of the first wavelength and to hardly exert the lens action for the light of the second and third wavelengths.

The third liquid crystal layer LC13 and the fourth liquid crystal layer LC14 are required to exert the lens action of the focal length f for the light of the second wavelength and to hardly exert the lens action for the light of the first and third wavelengths.

The fifth liquid crystal layer LC15 and the sixth liquid crystal layer LC16 are required to exert the lens action of the focal length f for the light of the third wavelength and to hardly exert the lens action for the light of the first and second wavelengths.

As described in equation (2) mentioned above, when the phase difference $\Gamma$ satisfies the condition $\pi$ or $(2n-1)\pi$, each of the first liquid crystal layer LC11, the second liquid crystal layer LC12, the third liquid crystal layer LC13, the fourth liquid crystal layer LC14, the fifth liquid crystal layer LC15, and the sixth liquid crystal layer LC16 exerts the desired lens action. In this case, n is an integer of 1 or more. When the phase difference $\Gamma$ satisfies the condition $2\pi$ or $2n\pi$, each of the first liquid crystal layer LC11, the second liquid crystal layer LC12, the third liquid crystal layer LC13, the fourth liquid crystal layer LC14, the fifth liquid crystal layer LC15, and the sixth liquid crystal layer LC16 hardly exerts the lens action.

For this reason, the first liquid crystal layer LC11 and the second liquid crystal layer LC12 are configured to have a phase difference $(2n-1)\pi$ for the first wavelength and a phase difference $2n\pi$ for the second and third wavelengths. In the example shown in the upper part of FIG. 11, the first liquid crystal layer LC11 and the second liquid crystal layer LC12 have a phase difference corresponding to $9\pi$ for the first wavelength ($\Delta n \cdot d=2,025$ nm), a phase difference corresponding to $6\pi$ for the second wavelength ($\Delta n \cdot d=1,590$ nm), and a phase difference corresponding to $4\pi$ for the third wavelength ($\Delta n \cdot d=1,260$ nm). The phase difference for the second wavelength is smaller than that for the first wavelength, and the phase difference for the third wavelength is smaller than that for the second wavelength. In other words, as regards the wavelength characteristics of the first liquid crystal layer LC11 and the second liquid crystal layer LC12, the phase difference decreases monotonically in accordance with the increase in wavelength. The first liquid crystal layer LC11 and the second liquid crystal layer LC12 having the wavelength characteristics can easily be manufactured.

The third liquid crystal layer LC13 and the fourth liquid crystal layer LC14 are configured to have a phase difference $(2n-1)\pi$ for the second wavelength and a phase difference $2n\pi$ for the first and third wavelengths. In the example shown in the middle part of FIG. 11, the third liquid crystal layer LC13 and the fourth liquid crystal layer LC14 have a phase difference corresponding to $6\pi$ for the first wavelength ($\Delta n \cdot d = 1{,}350$ nm), a phase difference corresponding to $3\pi$ for the second wavelength ($\Delta n \cdot d = 795$ nm), and a phase difference corresponding to $2\pi$ for the third wavelength ($\Delta n \cdot d = 630$ nm). The phase difference for the second wavelength is smaller than that for the first wavelength, and the phase difference for the third wavelength is smaller than that for the second wavelength. In other words, as regards the wavelength characteristics of the third liquid crystal layer LC13 and the fourth liquid crystal layer LC14, the phase difference decreases monotonically in accordance with the increase in wavelength. The third liquid crystal layer LC13 and the fourth liquid crystal layer LC14 having the wavelength characteristics can also easily be manufactured.

The fifth liquid crystal layer LC15 and the sixth liquid crystal layer LC16 are configured to have a phase difference $(2n-1)\pi$ for the third wavelength and a phase difference $2n\pi$ for the first and second wavelengths. In the example shown in the lower part of FIG. 11, the fifth liquid crystal layer LC15 and the sixth liquid crystal layer LC16 have a phase difference corresponding to $6\pi$ for the first wavelength ($\Delta n \cdot d = 1{,}350$ nm), a phase difference corresponding to $4\pi$ for the second wavelength ($\Delta n \cdot d = 1{,}060$ nm), and a phase difference corresponding to $3\pi$ for the third wavelength ($\Delta n \cdot d = 945$ nm). The phase difference for the second wavelength is smaller than that for the first wavelength, and the phase difference for the third wavelength is smaller than that for the second wavelength. In other words, as regards the wavelength characteristics of the fifth liquid crystal layer LC15 and the sixth liquid crystal layer LC16, the phase difference decreases monotonically in accordance with the increase in wavelength. The fifth liquid crystal layer LC15 and the sixth liquid crystal layer LC16 having the wavelength characteristics can also easily be manufactured.

The phase differences shown in FIG. 11 are examples, and the phase differences may decrease monotonically in accordance with the increase in wavelength. For example, the first liquid crystal layer LC11 and the second liquid crystal layer LC12 may be configured to have a phase difference $7\pi$ or $5\pi$ for the first wavelength, a phase difference $4\pi$ for the second wavelength, and a phase difference $2\pi$ for the third wavelength.

Thus, the first liquid crystal layer LC11 and the second liquid crystal layer LC12 can converge the light of the first wavelength to the position of the focal length f, the third liquid crystal layer LC13 and the fourth liquid crystal layer LC14 can converge the light of the second wavelength to the position of the focal length f, and the fifth liquid crystal layer LC15 and the sixth liquid crystal layer LC16 can converge the light of the third wavelength to the position of the focal length f.

As described above, the focal length f can be made to match for the light of the first wavelength, the second wavelength, and the third wavelength by applying the first configuration example of lens portion 10 described with reference to FIG. 5 through FIG. 11.

FIG. 12 is a view illustrating an optical action of the display device DSP.

The optical action for the light of the first wavelength, of the display light DL emitted from the display panel 2, will be described, and the lens action of the first lens element 11 and the second lens element 12 of the lens portion 10 will be described.

First, the display panel 2 emits the display light DL of the first linearly polarized light LP1. In this example, the first linearly polarized light LP1 is, for example, the linearly polarized light oscillating in a direction perpendicular to the drawing. The display light DL is assigned a quarter-wave phase difference when transmitted through the first retardation film R1. The display light DL is thereby converted into first circularly polarized light CP1 when transmitted through the first retardation film R1. In this example, the first circularly polarized light CP1 is, for example, left-handed circularly polarized light.

Part of the first circularly polarized light CP1 transmitted through the first retardation film R1 is transmitted through the semi-transparent layer HM and the other part of the first circularly polarized light CP1 is reflected on the semi-transparent layer HM. The first circularly polarized light CP1 transmitted through the semi-transparent layer HM is assigned a quarter-wave phase difference and is converted into second linearly polarized light LP2 when transmitted through the second retardation film R2. In this example, the second linearly polarized light LP2 is the linearly polarized light oscillating in a direction orthogonal to the first linearly polarized light LP1, i.e., a direction parallel to the drawing.

When the first circularly polarized light CP1 is reflected on the semi-transparent layer HM, the first circularly polarized light CP1 is converted into the second circularly polarized light CP2 turning in a reverse direction to the first circularly polarized light CP1. In this case, the second circularly polarized light CP2 is, for example, right-handed circularly polarized light. The second circularly polarized light CP2 reflected on the semi-transparent layer HM is transmitted through the first retardation film R1 and converted into the second linearly polarized light LP2, which is absorbed into the display panel 2.

The second linearly polarized light LP2 transmitted through the second retardation film R2 is reflected on the reflective polarizer PR. The second linearly polarized light LP2 reflected on the reflective polarizer PR is transmitted through the second retardation film R2 and converted into the first circularly polarized light CP1.

Part of the first circularly polarized light CP1 transmitted through the second retardation film R2 is reflected on the semi-transparent layer HM, and the other part of the first circularly polarized light CP1 is transmitted through the semi-transparent layer HM. The first circularly polarized light CP1 is converted into the second circularly polarized light CP2 when reflected on the semi-transparent layer HM. The second circularly polarized light CP2 reflected on the semi-transparent layer HM is transmitted through the second retardation film R2 and converted into the first linearly polarized light LP1.

The first circularly polarized light CP1 transmitted through the semi-transparent layer HM is transmitted through the first retardation film R1 and converted into the first linearly polarized light LP1.

The first linearly polarized light LP1 transmitted through the second retardation film R2 is transmitted through the reflective polarizer PR, further transmitted through the third retardation film R3, and converted into the first circularly polarized light CP1. The first circularly polarized light CP1 transmitted through the third retardation film R3 is converted to the second circularly polarized light CP2 and is converged by the lens action, at the first lens element 11 of the lens portion 10. Furthermore, the second circularly polarized light transmitted through the first lens element 11 is converted into the first circularly polarized light CP1 at the second lens element 12 and is converged to a user's eye E by the lens action.

In addition, the light of the second wavelength, of the display light DL, is converged to the user's eye E by the lens action of the third lens element 13 and the fourth lens element 14 of the lens portion 10, similarly to the light of the first wavelength. The light of the third wavelength, of the display light DL, is also converged to the user's eye E by the lens action of the fifth lens element 15 and the sixth lens element 16 of the lens portion 10, similarly to the light of the first wavelength.

According to such a display device DSP, the optical system 4 includes an optical path which passes three times between the semi-transparent layer HM and the reflective polarizer PR. In other words, in the optical system 4, an optical distance between the semi-transparent layer HM and the reflective polarizer PR is approximately three times as large as an actual interval between the semi-transparent layer HM and the reflective polarizer PR (or thickness of the air layer 4C). The display panel 2 is installed on an inner side than the focus of the lens portion 10 having the lens action. The user can thereby observe an extended virtual image.

In addition, the illumination device 3 comprises a laser light source that emits light with a narrow spectral width, and the focal length of each lens element of the lens portion 10 is optimized in accordance with the central wavelength of the light emitted from the laser light source. As a result, the light of the first, second, and third wavelengths can be efficiently converged to the same focal length, enabling the user to visually recognize clear images.

Furthermore, the thickness in the third direction Z can be reduced and the weight reduction can be implemented as compared with an optical system comprising optical components formed of glass, resin, and the like.

The first linearly polarized light LP1 described with reference to FIG. 12 may be replaced with the second linearly polarized light LP2 or the first circularly polarized light CP1 may be replaced with the second circularly polarized light CP2.

«Second Configuration Example of Lens Portion»

FIG. 13A is a cross-sectional view showing a second configuration example of the lens portion 10 shown in FIG. 3.

The lens portion 10 comprises a first lens element 111 including a first liquid crystal layer LC111, a second lens element 112 including a second liquid crystal layer LC112, a third lens element 113 including a third liquid crystal layer LC113, a first phase conversion element PC1 arranged between the first lens element 111 and the second lens element 112, and a second phase conversion element PC2 arranged between the second lens element 112 and the third lens element 113.

For example, the first lens element 111 is opposed to the third retardation film R3 in the third direction Z. In addition, the first lens element 111, the first phase conversion element PC1, the second lens element 112, the second phase conversion element PC2, and the third lens element 113 are stacked in this order along the third direction Z.

Each of the first lens element 111, second lens element 112, and the third lens element 113 in the second configuration example has, for example, a lens action of converging while converting the first circularly polarized light into the second circularly polarized light, and diverging while converting the second circularly polarized light into the first circularly polarized light, similarly to the first lens element 11 in the first configuration example described with reference to FIG. 6. The first liquid crystal layer LC111 of the first lens element 111, the second liquid crystal layer LC112 of the second lens element 112, and the third liquid crystal layer LC113 of the third lens element 113 are configured similarly to the first liquid crystal layer LC11 described with reference to FIG. 9 and FIG. 10. The lens action of each of the first lens element 111, the second lens element 112, and the third lens element 113 can be thereby exerted.

The first phase conversion element PC1 and the second phase conversion element PC2 control the rotation direction of the circularly polarized light for each wavelength.

FIG. 14 is a view illustrating the lens action of the lens portion 10 shown in FIG. 13A.

The first lens element 111 has a phase difference $\pi$ or $(2n-1)\pi$ for each of the light of the first wavelength (blue wavelength) B, the second wavelength (green wavelength) G, and the third wavelength (red wavelength) R. The first lens element 111 has the lens action of converging while converting the first circularly polarized light B1 of the first wavelength B into the second circularly polarized light B2, converging while converting the first circularly polarized light G1 of the second wavelength G into the second circularly polarized light G2, and converging while converting the first circularly polarized light R1 of the third wavelength R into the second circularly polarized light R2. A focal length f1B for the light of the first wavelength B is larger than a focal length f1G for the light of the second wavelength G, and the focal length f1G for the light of the second wavelength G is larger than a focal length f1R for the light of the third wavelength R (f1B>f1G>f1R).

The first phase conversion element PC1 has a phase difference $\pi$ or $(2n-1)\pi$ for each of the light of the first wavelength B and the second wavelength G, and a phase difference $2\pi$ or $2n\pi$ for the light of the third wavelength R. For this reason, the first phase conversion element PC1 converts the second circularly polarized light B2 transmitted through the first lens element 111 into the first circularly polarized light B1, converts the second circularly polarized light G2 into the first circularly polarized light G1, and maintains the polarization state of the second circularly polarized light R2.

The second lens element 112 has a phase difference $\pi$ or $(2n-1)\pi$ for each of the light of the first wavelength B, the second wavelength G, and the third wavelength R. The second lens element 112 has the lens action of converging while converting the first circularly polarized light B1 transmitted through the first phase conversion element PC1 into the second circularly polarized light B2, converging while converting the first circularly polarized light G1 into the second circularly polarized light G2, and diverging while converting the second circularly polarized light R2 into the first circularly polarized light R1. A focal length f2B for the light of the first wavelength B is larger than a focal length f2G for the light of the second wavelength G, and the focal length f2G for the light of the second wavelength G is larger than a focal length f2R (absolute value) for the light of the third wavelength R (f2B>f2G>f2R).

The second phase conversion element PC2 has a phase difference ii or $(2n-1)\pi$ for each of the light of the first wavelength B and the third wavelength R, and a phase difference $2\pi$ or $2n\pi$ for the light of the second wavelength G. For this reason, the second phase conversion element PC2 converts the second circularly polarized light B2 transmitted through the second lens element 112 into the first circularly polarized light B1, maintains the polarization state of the second circularly polarized light G2, and converts the first circularly polarized light R1 into the second circularly polarized light R2.

The third lens element 113 has a phase difference $\pi$ or $(2n-1)\pi$ for each of the light of the first wavelength B, the second wavelength G, and the third wavelength R. The third lens element 113 has the lens action of converging while converting the first circularly polarized light B1 transmitted through the second phase conversion element PC2 into the second circularly polarized light B2, diverging while converting the second circularly polarized light G2 into the first circularly polarized light G1, and diverging while converting the second circularly polarized light R2 into the first circularly polarized light R1. A focal length f3B for the light of the first wavelength B is larger than a focal length f3G (absolute value) for the light of the second wavelength G, and the focal length f3G for the light of the second wavelength G is larger than a focal length f3R (absolute value) for the light of the third wavelength R (f3B>f3G>f3R).

The focal lengths f1B, f1G, and f1R of the first lens element 111, the focal lengths f2B, f2G, and f2R of the second lens element 112, and the focal lengths f3B, f3G, and f3R of the third lens element 113 are set to satisfy equations (4), (5), and (6) in the drawing. It is assumed here that an inter-lens distance is extremely small. The focal length fB for the first wavelength B, the focal length fG for the second wavelength G, and the focal length fR of the third wavelength R, in the lens portion 10 thereby become the same focal length f. In other words, the light of the first wavelength B, second wavelength G, and third wavelength R is converged at the same focal length.

FIG. 15 is a graph illustrating wavelength characteristics of the first phase conversion element PC1 and the second phase conversion element PC2.

An upper part of FIG. 15 is a graph illustrating the wavelength characteristics of the first phase conversion element PC1. A lower part of FIG. 15 is a graph illustrating wavelength characteristics of the second phase conversion element PC2. In each graph showing the wavelength characteristics, the horizontal axis indicates a wavelength (nm) and the vertical axis indicates $\Delta n \cdot d$ (nm).

As described above, the first phase shifter PC1 is required to convert the rotation direction of the circularly polarized light for the light of the first wavelength (blue wavelength: 450 nm), to convert the rotation direction of the circularly polarized light for the light of the second wavelength (green wavelength: 530 nm), and to maintain the rotation direction of the circularly polarized light for the light of the third wavelength (red wavelength: 630 nm).

The second phase shifter PC2 is required to convert the rotation direction of the circularly polarized light for the light of the first wavelength, to maintain the rotation direction of the circularly polarized light for the light of the second wavelength, and to convert the rotation direction of the circularly polarized light for the light of the third wavelength.

For this reason, the first phase conversion element PC1 is configured to have a phase difference $(2n-1)\pi$ for the first wavelength, a phase difference $(2n-1)\pi$ for the second wavelength, and a phase difference $2n\pi$ for the third wavelength when n is an integer of 1 or more. In the example shown in the upper part of FIG. 15, the first phase conversion element PC1 has a phase difference corresponding to $7\pi$ for the first wavelength ($\Delta n \cdot d = 1,575$ nm), a phase difference corresponding to $5\pi$ for the second wavelength ($\Delta n \cdot d = 1,325$ nm), and a phase difference corresponding to $4\pi$ for the third wavelength ($\Delta n \cdot d = 1,260$ nm). The phase difference for the second wavelength is smaller than that for the first wavelength, and the phase difference for the third wavelength is smaller than that for the second wavelength. In other words, as for the wavelength characteristics of the first phase conversion element PC1, the phase difference decreases monotonically in accordance with the increase in wavelength.

The second phase conversion element PC2 is configured to have a phase difference $(2n-1)\pi$ for the first wavelength, a phase difference $2n\pi$ for the second wavelength, and a phase difference $(2n-1)\pi$ for the third wavelength. In the example shown in the lower part of FIG. 15, the second phase conversion element PC2 has a phase difference corresponding to $5\pi$ for the first wavelength ($\Delta n \cdot d = 1,125$ nm), a phase difference corresponding to $2\pi$ for the second wavelength ($\Delta n \cdot d = 530$ nm), and a phase difference corresponding to it for the third wavelength ($\Delta n \cdot d = 315$ nm). The phase difference for the second wavelength is smaller than that for the first wavelength, and the phase difference for the third wavelength is smaller than that for the second wavelength. In other words, as for the wavelength characteristics of the second phase conversion element PC2, the phase difference decreases monotonically in accordance with the increase in wavelength.

The phase differences shown in FIG. 15 are examples, and the phase differences may decrease monotonically in accordance with the increase in wavelength. For example, the first phase conversion element PC1 may be configured to have a phase difference $5\pi$ for the first wavelength, a phase difference $3\pi$ for the second wavelength, and a phase difference $2\pi$ for the third wavelength.

FIG. 16 is a graph illustrating the wavelength characteristics of the liquid crystal layer constituting the lens element.

The horizontal axis indicates a wavelength (nm) and the vertical axis indicates $\Delta n \cdot d$ (nm).

As described above, each of the first lens element 111, the second lens element 112, and the third lens element 113 is required to convert the rotation direction of the circularly polarized light for the light of the first wavelength (blue wavelength: 450 nm), to convert the rotation direction of the circularly polarized light for the light of the second wavelength (green wavelength: 530 nm), and to convert the rotation direction of the circularly polarized light for the light of the third wavelength (red wavelength: 630 nm).

For this reason, each of the first lens element 111, the second lens element 112, and the third lens element 113 is configured to have a phase difference $(2n-1)\pi$ for the first wavelength, a phase difference $(2n-1)\pi$ for the second wavelength, and a phase difference $(2n-1)\pi$ for the third wavelength. In this case, n is an integer of 1 or more.

Ideal wavelength characteristics of each of the first lens element 111, the second lens element 112, and the third lens element 113 are shown in FIG. 16. In the example shown in FIG. 16, each of the first lens element 111, the second lens element 112, and the third lens element 113 has a phase difference corresponding to $\pi$ for each of the first wavelength, the second wavelength, and the third wavelength. The phase difference for the second wavelength is smaller than that for the first wavelength, and the phase difference for the third wavelength is smaller than that for the second wavelength. In other words, the wavelength characteristics shown here correspond to inverse wavelength dispersion characteristics in which the phase difference increases monotonically in accordance with the increase in wavelength.

When such a second configuration example of the lens portion 10 is applied, too, the same advantages as those of the first configuration example can be obtained by exerting the same optical action as that described with reference to FIG. 12.

The above-described first and second configuration examples may be combined. More specifically, as shown in FIG. 13B, the lens portion 10 further comprises a fourth lens element to be combined with the first lens element 111, a fifth lens element to be combined with the second lens element 112, and a sixth lens element to be combined with the third lens element 113. The fourth lens element has the same configuration as the first lens element 111 and corresponds to a lens element obtained by turning the first lens element 111 upside down. The fifth lens element has the same configuration as the second lens element 112 and corresponds to a lens element obtained by turning the second lens element 112 upside down. The sixth lens element has the same configuration as the third lens element 113 and corresponds to a lens element obtained by turning the third lens element 113 upside down. According to the configuration example, the synergistic effects of the first and second configuration examples can be obtained.

Example 2

FIG. 17 is a cross-sectional view showing example 2 of the display device DSP.

Example 2 shown in FIG. 17 is different from example 1 shown in FIG. 3 in that the second retardation film R2, the reflective polarizer PR, and the third retardation film R3 are replaced with a first selective reflection portion 201.

The display device DSP comprises a display panel 2, an illumination device 3, and an optical system 4. The display panel 2 and the illumination device 3 are denoted by the same reference numerals as those of example 1 shown in FIG. 3 and their descriptions are omitted, but the display panel 2 is configured to emit display light DL of linearly polarized light in the display area DA.

The first structure 4A of the optical system 4 comprises the first retardation film R1 and the semi-transparent layer HM. The first retardation film R1 is a quarter-wave plate. The semi-transparent layer HM transmits part of the incident light and reflects the other light.

The first retardation film R1 and the semi-transparent layer HM are stacked in this order along the third direction Z. The first retardation film R1 is in contact with the display panel 2, the semi-transparent layer HM is in contact with the first retardation film R1, and the first retardation film R1 is arranged between the display panel 2 and the semi-transparent layer HM.

The second structure 4B of the optical system 4 comprises the first selective reflection portion 201 and the lens portion 10. The first selective reflection portion 201 comprises an optical element including a cholesteric liquid crystal layer, which will be described later. The first configuration example described above with reference to FIG. 5 and the like, the second configuration example described above with reference to FIG. 13A and the like, or the other configuration example described above with reference to FIG. 13B, can be applied to the lens portion 10.

The first selective reflective section 201 and the lens portion 10 are stacked in this order along the third direction Z. The lens portion 10 is in contact with the first selective reflection portion 201. The first selective reflection portion 201 is separated from the semi-transparent layer HM and is opposed to the semi-transparent layer HM through the air layer 4C in the third direction Z. In addition, the first selective reflection portion 201 is arranged between the semi-transparent layer HM and the lens portion 10.

FIG. 18 is a cross-sectional view showing a configuration example of the first selective reflection portion 201 shown in FIG. 17.

The first selective reflective section 201 comprises a first optical element 21, a second optical element 22, and a third optical element 23.

For example, the third optical element 23 is opposed to the lens portion 10 in the third direction Z. In addition, the first optical element 21, the second optical element 22, and the third optical element 23 are stacked in this order along the third direction Z, but the stacking order may be different from that of the illustrated example.

The first optical element 21 includes a first cholesteric liquid crystal layer LC21 that reflects the first circularly polarized light of the first wavelength (for example, blue wavelength B) toward the semi-transmissive layer HM and transmits the second circularly polarized light.

The second optical element 22 includes a second cholesteric liquid crystal layer LC22 that reflects the first circularly polarized light of the light of the second wavelength (for example, green wavelength G) toward the semi-transparent layer HM and transmits the second circularly polarized light.

The third optical element 23 includes a third cholesteric liquid crystal layer LC23 that reflects the first circularly polarized light of the third wavelength (for example, red wavelength R) toward the semi-transmissive layer HM and transmits the second circularly polarized light.

FIG. 19 is a cross-sectional view showing an example of the first optical element 21 shown in FIG. 18.

The first cholesteric liquid crystal layer LC21 of the first optical element 21 will be described here. The first optical element 21 may comprise a transparent substrate and an alignment film, but their illustration and description are omitted.

The first cholesteric liquid crystal layer LC21 has a thickness d2 along the third direction Z. To simplify the illustration, in FIG. 19, one liquid crystal molecule LM2 represents a liquid crystal molecule facing in the average alignment direction, of the plurality of liquid crystal molecules located in the X-Y plane.

In other words, the first cholesteric liquid crystal layer LC21 includes a plurality of liquid crystal structures LS21. When one liquid crystal structure LS21 is focused, the liquid crystal structure LS21 includes a liquid crystal molecule LM21 located on one end side and a liquid crystal molecule LM22 on the other end side. The plurality of liquid crystal molecules LM2 containing the liquid crystal molecule LM21 and the liquid crystal molecule LM22 are stacked spirally along the third direction Z while turning. The alignment directions of the liquid crystal molecule LM21 are substantially coincident with the alignment directions of the liquid crystal molecule LM22. The liquid crystal structure LS21 has a helical pitch P. The helical pitch P indicates one period (360 degrees) of the spiral. For example, the thickness d2 of the first cholesteric liquid crystal layer LC21 is several times or more as large as the helical pitch P.

In addition, in the first cholesteric liquid crystal layer LC21, the plurality of liquid crystal structures LS21 adjacent in the first direction X have alignment directions parallel to each other. Similarly, the plurality of liquid crystal structures LS21 adjacent in the second direction Y have alignment directions parallel to each other. In other words, the alignment directions of the plurality of liquid crystal molecules LM21 are substantially the same as each other. The alignment directions of the plurality of liquid crystal molecules LM22 are also substantially the same as each other.

The first cholesteric liquid crystal layer LC21 has a plurality of reflective planes LMR as represented by one-dot chain lines. The plurality of reflective planes LMR are formed along the X-Y plane and are substantially parallel to each other. The reflective planes LMR reflect part of the circularly polarized light of the incident light and transmit the other part of the circularly polarized light according to the Bragg's law. The reflective planes LMR correspond to planes where alignment directions of the liquid crystal molecules LM2 are parallel to each other or planes (equiphase wave surfaces) where the spatial planes are same.

The liquid crystal structures LS21 reflect the circularly polarized light having the same turning direction as the turning direction of the liquid crystal structures LS21, of the light of the first wavelength. For example, when the turning direction of the liquid crystal structures LS21 is right-handed, the liquid crystal structures LS21 reflect the right-handed circularly polarized light, of the light of the first wavelength, and transmit the left-handed circularly polarized light. Similarly, when the turning direction of the liquid crystal structures LS21 is left-handed, the liquid crystal structures LS21 reflect the left-handed circularly polarized light, of the light of the first wavelength, and transmit the right-handed circularly polarized light.

Such a first cholesteric liquid crystal layer LC21 is cured in a state in which the alignment directions of the liquid crystal molecules LM2 containing the liquid crystal molecules LM21 and the liquid crystal molecules LM22 are fixed. In other words, the alignment directions of the liquid crystal molecules LM2 are not controlled depending on the electric field. For this reason, the first optical element 21 does not comprise an electrode for controlling the alignment.

When the helix pitch of the liquid crystal structures LS21 is referred to as P, the refractive index for extraordinary light is referred to as ne, and the refractive index for ordinary light is referred to as no, the selective reflection bandwidth $\Delta\lambda$ of the cholesteric liquid crystal layer for vertically incident light is generally expressed as "(no-ne)*P". For this reason, the helical pitch P1 and the refractive indices ne and no of the liquid crystal structures LS21 are set such that the first wavelength is included in the selective reflection wavelength band $\Delta\lambda$ of the first cholesteric liquid crystal layer LC21 to efficiently reflect the circularly polarized light of the first wavelength on the reflective planes LMR.

The second cholesteric liquid crystal layer LC22 of the second optical element 22 also includes a plurality of liquid crystal structures LS22, similarly to the first cholesteric liquid crystal layer LC21. The helical pitch P2 and the refractive indices ne and no of the liquid crystal structures LS22 are set such that the second wavelength is included in the selective reflection wavelength band $\Delta\lambda$ of the second cholesteric liquid crystal layer LC22 to efficiently reflect the circularly polarized light of the second wavelength on the reflective planes LMR of the second cholesteric liquid crystal layer LC22.

The third cholesteric liquid crystal layer LC23 of the third optical element 23 also includes a plurality of liquid crystal structures LS23, similarly to the first cholesteric liquid crystal layer LC21. The helical pitch P3 and the refractive indices ne and no of the liquid crystal structures LS23 are set such that the third wavelength is included in the selective reflection wavelength band $\Delta\lambda$ of the third cholesteric liquid crystal layer LC23 to efficiently reflect the circularly polarized light of the third wavelength on the reflective planes LMR of the third cholesteric liquid crystal layer LC23.

FIG. 20 is a view illustrating the first optical element 21, the second optical element 22, and the third optical element 23 shown in FIG. 18.

The first optical element 21 is configured to reflect the first circularly polarized light of the first wavelength (blue wavelength) and to transmit the second circularly polarized light of the first wavelength. In other words, the helical pitch P1 of the liquid crystal structure LS21 included in the first cholesteric liquid crystal layer LC21 is optimized to correspond to the center wavelength $\lambda$b of the blue laser light emitted from the first light emitting element LD1 of the illumination device 3.

The second optical element 22 is configured to reflect the first circularly polarized light of the second wavelength (green wavelength) and to transmit the second circularly polarized light of the second wavelength. In other words, the helical pitch P2 of the liquid crystal structure LS22 included in the second cholesteric liquid crystal layer LC22 is optimized to correspond to the center wavelength $\lambda$g of the green laser light emitted from the second light emitting element LD2 of the illumination device 3. For this reason, the helical pitch P2 in the second optical element 22 is larger than the helical pitch P1 in the first optical element 21.

The third optical element 23 is configured to reflect the first circularly polarized light of the third wavelength (red wavelength) and to transmit the second circularly polarized light of the third wavelength. In other words, the helical pitch P3 of the liquid crystal structure LS23 included in the third cholesteric liquid crystal layer LC23 is optimized to correspond to the center wavelength $\lambda$r of the red laser light emitted from the third light emitting element LD3 of the illumination device 3. For this reason, the helical pitch P3 in the third optical element 23 is larger than the helical pitch P2 in the second optical element 22.

The liquid crystal structures turning in the first turning direction are schematically shown and enlarged in FIG. 20. The liquid crystal structure LS21, the liquid crystal structure LS22, and the liquid crystal structure LS23 are all turned in the same direction and are all configured to reflect the first circularly polarized light.

FIG. 21 is a view illustrating the optical action of the display device DSP.

The optical action for the light of the first wavelength, of the display light DL emitted from the display panel 2, will be described here.

First, the display panel 2 emits the display light DL of the first linearly polarized light LP1. The display light DL is transmitted through the first retardation film R1 and converted into the first circularly polarized light CP1.

Part of the first circularly polarized light CP1 transmitted through the first retardation film R1 is transmitted through the semi-transparent layer HM and the other part of the first circularly polarized light CP1 is reflected on the semi-transparent layer HM. The first circularly polarized light CP1 transmitted through the semi-transparent layer HM is reflected on the first selective reflection portion 201.

The first circularly polarized light CP1 is converted into the second circularly polarized light CP2 when reflected on the semi-transparent layer HM. The second circularly polarized light CP2 reflected on the semi-transparent layer HM is transmitted through the first retardation film R1 and converted into the second linearly polarized light LP2, which is absorbed into the display panel 2.

Part of the first circularly polarized light CP1 reflected on the first selective reflection portion 201 is transmitted through the semi-transparent layer HM and the other part of the first circularly polarized light CP1 is reflected on the semi-transparent layer HM. The first circularly polarized light CP1 is converted into the second circularly polarized light CP2 when reflected on the semi-transparent layer HM.

The first circularly polarized light CP1 transmitted through the semi-transparent layer HM is transmitted through the first retardation film R1 and converted into the first linearly polarized light LP1.

The second circularly polarized light CP2 reflected on the semi-transparent layer HM is transmitted through the first selective reflection portion 201. The second circularly polarized light CP2 transmitted through the first selective reflective section 201 is converged to the user's eye E by the lens action of the lens portion 10.

In the example 2, too, the same advantages as those of the above-described example 1 can be obtained. In addition, the number of the components constituting the optical system 4 can be reduced.

The first linearly polarized light LP1 described with reference to FIG. 21 may be replaced with the second linearly polarized light LP2 or the first circularly polarized light CP1 may be replaced with the second circularly polarized light CP2.

According to the embodiments, as described above, the lens portion and the display device capable of improving the display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

What is claimed is:

1. A lens portion comprising:

a first lens element having a lens action of converging while converting first circularly polarized light of a first wavelength into second circularly polarized light of a reverse direction;

a second lens element having a lens action of converging while converting first circularly polarized light of a second wavelength different from the first wavelength into second circularly polarized light of a reverse direction; and a third lens element having a lens action of converging while converting first circularly polarized light of a third wavelength different from the first wavelength and the second wavelength into second circularly polarized light of a reverse direction, wherein when n is an integer of 1 or more, the first lens element has a phase difference $(2n-1)\pi$ for the first wavelength and a phase difference $2n\pi$ for the second wavelength and the third wavelength, the second lens element has a phase difference $(2n-1)\pi$ for the second wavelength and a phase difference $2n\pi$ for the first wavelength and the third wavelength, the third lens element has a phase difference $(2n-1)\pi$ for the third wavelength and a phase difference $2n\pi$ for the first wavelength and the second wavelength, in the first to third lens elements, the phase difference for the second wavelength is smaller than the phase difference for the first wavelength, the phase difference for the third wavelength is smaller than the phase difference for the second wavelength, each of the first to third lens elements includes a liquid crystal layer cured in a state in which alignment directions of a plurality of liquid crystal molecules containing first liquid crystal molecules and second liquid crystal molecules are fixed, the liquid crystal layer includes a first annular area in which the first liquid crystal molecules are aligned in a same direction and a second annular area in which the second liquid crystal molecules are aligned in a same direction outside the first annular area, in planar view, a circle surrounding the first annular area and a circle surrounding the second annular area have same centers, and an alignment direction of the first liquid crystal molecules is different from an alignment direction of the second liquid crystal molecules.

2. A lens portion comprising:

a first lens element having a lens action of converging while converting first circularly polarized light of a first wavelength into second circularly polarized light of a reverse direction, converging while converting first circularly polarized light of a second wavelength different from the first wavelength into second circularly polarized light of a reverse direction, and converging while converting first circularly polarized light of a third wavelength different from the first wavelength and the second wavelength into second circularly polarized light of a reverse direction;

a second lens element having a lens action of converging while converting the first circularly polarized light of the first wavelength into the second circularly polarized light, converging while converting the first circularly polarized light of the second wavelength into the second circularly polarized light, and diverging while converting the second circularly polarized light of the third wavelength into the first circularly polarized light;

a third lens element having a lens action of converging while converting the first circularly polarized light of the first wavelength into the second circularly polarized light, diverging while converting the second circularly polarized light of the second wavelength into the first circularly polarized light, and diverging while converting the second circularly polarized light of the third wavelength into the first circularly polarized light;

a first phase conversion element arranged between the first lens element and the second lens element, and having a phase difference $(2n-1)\pi$ for the first wavelength and the second wavelength and a phase difference $2n\pi$ for the third wavelength when n is an integer of 1 or more; and a second phase conversion element arranged between the second lens element and the third lens element, and having a phase difference $(2n-1)\pi$ for the first wavelength and the third wavelength and a phase difference $2n\pi$ for the second wavelength, wherein in the first phase conversion element and the second phase conversion element, the phase difference for the second wavelength is smaller than the phase difference for the first wavelength, the phase difference for the third wavelength is smaller than the phase difference for the second wavelength, the first wavelength is shorter than the second wavelength, the second wavelength is shorter than the third wavelength, each of the first to third lens elements includes a liquid crystal layer cured in a state in which alignment directions of a plurality of liquid crystal molecules containing first liquid crystal molecules and second liquid crystal molecules are fixed, the liquid crystal layer includes a first annular area in which the first liquid crystal molecules are aligned in a same direction and a second annular area in which the second liquid crystal molecules are aligned in a same direction outside the first annular area, in planar view, a circle surrounding the first annular area and a circle surrounding the second annular area have same centers, and an alignment direction of the first liquid crystal molecules is different from an alignment direction of the second liquid crystal molecules.

3. The lens portion of claim 1, further comprising:

a fourth lens element having a lens action of converging while converting the second circularly polarized light of the first wavelength into the first circularly polarized light of the first wavelength;

a fifth lens element having a lens action of converging while converting the second circularly polarized light of the second wavelength into the first circularly polarized light of the second wavelength; and a sixth lens element having a lens action of converging while converting the second circularly polarized light of the third wavelength into the first circularly polarized light of the third wavelength, wherein when n is an integer of 1 or more, the fourth lens element has a phase difference $(2n-1)\pi$ for the first wavelength and a phase difference $2n\pi$ for the second wavelength and the third wavelength, the fifth lens element has a phase difference $(2n-1)\pi$ for the second wavelength and a phase difference $2n\pi$ for the first wavelength and the third wavelength, the sixth lens element has a phase difference $(2n-1)\pi$ for the third wavelength and a phase difference $2n\pi$ for the first wavelength and the second wavelength, in the fourth to sixth lens elements, the phase difference for the second wavelength is smaller than the phase difference for the first wavelength, the phase difference for the third wavelength is smaller than the phase difference for the second wavelength, each of the fourth to sixth lens elements includes the liquid crystal layer, the alignment direction of the first liquid crystal molecules of the first lens element is line symmetry with the alignment direction of the first liquid crystal molecules of the fourth lens element, with respect to a line passing the centers, in planar view, the alignment direction of the first liquid crystal molecules of the second lens element is line symmetry with the alignment direction of the first liquid crystal molecules of the fifth lens element, with respect to a line passing the centers, in planar view, and the alignment direction of the first liquid crystal molecules of the third lens element is line symmetry with the alignment direction of the first liquid crystal molecules of the sixth lens element, with respect to a line passing the centers, in planar view.

4. The lens portion of claim 2, further comprising:

a fourth lens element having a lens action of converging while converting the second circularly polarized light of the first wavelength into the first circularly polarized light of a reverse direction, converging while converting the second circularly polarized light of the second wavelength into the first circularly polarized light of a reverse direction, and converging while converting the second circularly polarized light of the third wavelength into the first circularly polarized light of a reverse direction;

a fifth lens element having a lens action of converging while converting the second circularly polarized light of the first wavelength into the first circularly polarized light, converging while converting the second circularly polarized light of the second wavelength into the first circularly polarized light, and diverging while converting the first circularly polarized light of the third wavelength into the second circularly polarized light; and a sixth lens element having a lens action of converging while converting the second circularly polarized light of the first wavelength into the first circularly polarized light, diverging while converting the first circularly polarized light of the second wavelength into the second circularly polarized light, and diverging while converting the first circularly polarized light of the third wavelength into the second circularly polarized light, wherein each of the fourth to sixth lens elements includes the liquid crystal layer, the alignment direction of the first liquid crystal molecules of the first lens element is line symmetry with the alignment direction of the first liquid crystal molecules of the fourth lens element, with respect to a line passing the centers, in planar view, the alignment direction of the first liquid crystal molecules of the second lens element is line symmetry with the alignment direction of the first liquid crystal molecules of the fifth lens element, with respect to a line passing the centers, in planar view, and the alignment direction of the first liquid crystal molecules of the third lens element is line symmetry with the alignment direction of the first liquid crystal molecules of the sixth lens element, with respect to a line passing the centers, in planar view.

5. A display device comprising:

a display panel including a polarizer and being configured to emit display light of linearly polarized light;

a semi-transparent layer;

a first retardation film arranged between the display panel and the semi-transparent layer;

a reflective polarizer configured to transmit first linearly polarized light and to reflect second linearly polarized light orthogonal to the first linearly polarized light;

a second retardation film arranged between the semi-transparent layer and the reflective polarizer;

a lens portion; and a third retardation film arranged between the reflective polarizer and the lens portion, wherein the lens portion comprises:

a first lens element having a lens action of converging while converting first circularly polarized light of a first wavelength into second circularly polarized light of a reverse direction; and a second lens element stacked on the first lens element and having a lens action of converging while converting the second circularly polarized light of the first wavelength into the first circularly polarized light of the first wavelength, each of the first lens element and the second lens element includes a liquid crystal layer cured in a state in which alignment directions of a plurality of liquid crystal molecules containing first liquid crystal molecules and second liquid crystal molecules are fixed, the liquid crystal layer includes a first annular area in which the first liquid crystal molecules are aligned in a same direction and a second annular area in which the second liquid crystal molecules are aligned in a same direction outside the first annular area, in planar view, a circle surrounding the first annular area and a circle surrounding the second annular area have same centers, an alignment direction of the first liquid crystal molecules is different from an alignment direction of the second liquid crystal molecules, the first annular area of the first lens element overlaps the first annular area of the second lens element, the alignment direction of the first liquid crystal molecules of the first lens element is line symmetry with the alignment direction of the first liquid crystal molecules of the second lens element, with respect to a line passing the centers, in planar view, the lens portion is separated from the reflective polarizer, and the first retardation film, the second retardation film, and the third retardation film are quarter-wave plates.

6. A display device comprising:

a display panel including a polarizer and being configured to emit display light of linearly polarized light;

a semi-transparent layer;

a first retardation film arranged between the display panel and the semi-transparent layer;

a lens portion; and a first selective reflection portion arranged between the semi-transparent layer and the lens portion and separated from the semi-transparent layer, wherein the lens portion comprises:

a first lens element having a lens action of converging while converting first circularly polarized light of a first wavelength into second circularly polarized light of a reverse direction; and a second lens element stacked on the first lens element and having a lens action of converging while converting the second circularly polarized light of the first wavelength into the first circularly polarized light of the first wavelength, each of the first lens element and the second lens element includes a liquid crystal layer cured in a state in which alignment directions of a plurality of liquid crystal molecules containing first liquid crystal molecules and second liquid crystal molecules are fixed, the liquid crystal layer includes a first annular area in which the first liquid crystal molecules are aligned in a same direction and a second annular area in which the second liquid crystal molecules are aligned in a same direction outside the first annular area, in planar view, a circle surrounding the first annular area and a circle surrounding the second annular area have same centers, an alignment direction of the first liquid crystal molecules is different from an alignment direction of the second liquid crystal molecules, the first annular area of the first lens element overlaps the first annular area of the second lens element, the alignment direction of the first liquid crystal molecules of the first lens element is line symmetry with the alignment direction of the first liquid crystal molecules of the second lens element, with respect to a line passing the centers, in planar view, the lens portion is separated from the semi-transparent layer, the first retardation film is a quarter-wave plate, and the first selective reflection portion comprises a first optical element including a first cholesteric liquid crystal layer that reflects first circularly polarized light of a first wavelength toward the semi-transparent layer and transmits second circularly polarized light of a reverse direction from the first circularly polarized light of the first wavelength.

7. A display device comprising:

a display panel including a polarizer and being configured to emit display light of linearly polarized light;

a semi-transparent layer;

a first retardation film arranged between the display panel and the semi-transparent layer;

a reflective polarizer configured to transmit first linearly polarized light and to reflect second linearly polarized light orthogonal to the first linearly polarized light;

a second retardation film arranged between the semi-transparent layer and the reflective polarizer;

the lens portion of one of claims 1 to 4; and a third retardation film arranged between the reflective polarizer and the lens portion, wherein the lens portion is separated from the reflective polarizer, and the first retardation film, the second retardation film, and the third retardation film are quarter-wave plates.

8. A display device comprising:

a display panel including a polarizer and being configured to emit display light of linearly polarized light;

a semi-transparent layer;

a first retardation film arranged between the display panel and the semi-transparent layer;

the lens portion of one of claims 1 to 4; and a first selective reflection portion arranged between the semi-transparent layer and the lens portion and separated from the semi-transparent layer, wherein the lens portion is separated from the semi-transparent layer, the first retardation film is a quarter-wave plate, and the first selective reflection portion comprises:

a first optical element including a first cholesteric liquid crystal layer that reflects first circularly polarized light of a first wavelength toward the semi-transparent layer and transmits second circularly polarized light of a reverse direction from the first circularly polarized light of the first wavelength;

a second optical element stacked on the first optical element and including a second cholesteric liquid crystal layer that reflects first circularly polarized light of a second wavelength different from the first wavelength toward the semi-transparent layer and transmits second circularly polarized light of a reverse direction from the first circularly polarized light of the second wavelength; and a third optical element stacked on the second optical element and including a third cholesteric liquid crystal layer that reflects first circularly polarized light of a third wavelength different from the first wavelength and the second wavelength toward the semi-transparent layer and transmits second circularly polarized light of a reverse direction from the first circularly polarized light of the third wavelength.

9. The display device of claim 8, wherein a helical pitch of the second cholesteric liquid crystal layer is larger than a helical pitch of the first cholesteric liquid crystal layer, and a helical pitch of the third cholesteric liquid crystal layer is larger than the helical pitch of the second cholesteric liquid crystal layer.

\* \* \* \* \*